(12) United States Patent
Strelioff et al.

(10) Patent No.: US 12,098,725 B2
(45) Date of Patent: Sep. 24, 2024

(54) PORTABLE GRAIN CONDITIONERS

(71) Applicant: WPS Investments Limited, Saskatoon (CA)

(72) Inventors: William Strelioff, Saskatoon (CA); Sean Strelioff, Warman (CA); Jason Griffith, Saskatoon (CA)

(73) Assignee: WPS Investments Ltd., Saskatoon (CA)

( * ) Notice: Subject to any disclaimer, the term of this patent is extended or adjusted under 35 U.S.C. 154(b) by 709 days.

(21) Appl. No.: 17/370,996

(22) Filed: Jul. 8, 2021

(65) Prior Publication Data

US 2023/0011178 A1 Jan. 12, 2023

(51) Int. Cl.
| | |
|---|---|
| *F04D 25/02* | (2006.01) |
| *A01F 25/22* | (2006.01) |
| *F04D 27/00* | (2006.01) |
| *F04D 29/40* | (2006.01) |
| *F04D 29/70* | (2006.01) |

(Continued)

(52) U.S. Cl.
CPC .............. *F04D 25/02* (2013.01); *A01F 25/22* (2013.01); *F04D 27/00* (2013.01); *F04D 29/403* (2013.01); *F04D 29/703* (2013.01); *F26B 9/063* (2013.01); *F26B 21/10* (2013.01); *F26B 25/22* (2013.01); *F28F 9/005* (2013.01)

(58) Field of Classification Search
CPC ........ F04D 25/02; F04D 27/00; F04D 29/703; F04D 29/403; A01F 25/22; F28F 9/005
USPC ............................................................. 34/86
See application file for complete search history.

(56) References Cited

U.S. PATENT DOCUMENTS

| | | | | |
|---|---|---|---|---|
| 3,538,618 A | * | 11/1970 | Neuenschwander ... | F26B 9/082 34/102 |
| 3,943,636 A | * | 3/1976 | Sietmann ................ | F26B 9/063 34/526 |

(Continued)

FOREIGN PATENT DOCUMENTS

| | | |
|---|---|---|
| CA | 2226043 C | 10/2000 |
| CA | 2782952 A1 | 1/2013 |

(Continued)

OTHER PUBLICATIONS

Aeration Anywhere Off-Grid Grain Aerator Page available at https://aerationanywhere.godaddysites.com/ (last accessed Mar. 13, 2020).

(Continued)

*Primary Examiner* — Stephen M Gravini
(74) *Attorney, Agent, or Firm* — LeonardPatel PC; Michael A. Leonard, II; Sheetal S. Patel

(57) ABSTRACT

Potentially off-grid grain conditioners that can be operably connected to an aeration grain bin or silo to blow heated air through the crop to dry the crop or to blow ambient temperature air through the crop to cool it are disclosed. A fan is powered by a motor that may be mounted inside the air stream to allow the heat from the motor to be collected and forced into the airstream that is blown into the grain bin. The engine exhaust may be routed through an air exchanger to remove heat from the exhaust and direct heat into the grain bin, or the exhaust may be put into the atmosphere without capturing any of the heat, which allows the fan to operate in a cooling mode. The motor may be mounted inline or mounted to the side for a centrifugal aeration fan.

23 Claims, 23 Drawing Sheets

(51) Int. Cl.
*F26B 9/06* (2006.01)
*F26B 21/10* (2006.01)
*F26B 25/22* (2006.01)
*F28F 9/00* (2006.01)

(56) References Cited

U.S. PATENT DOCUMENTS

| | | | |
|---|---|---|---|
| 3,972,674 A * | 8/1976 | Harrell | A24B 1/02 |
| | | | 432/500 |
| 4,003,139 A | 1/1977 | Winkle | |
| 4,688,332 A | 8/1987 | Kallestad et al. | |
| 5,400,525 A | 3/1995 | Sheley | |
| 6,029,367 A | 2/2000 | Moody | |
| 6,219,937 B1 * | 4/2001 | Culp | F26B 21/02 |
| | | | 432/103 |
| 8,061,056 B2 * | 11/2011 | Hedberg | B04B 15/08 |
| | | | 118/52 |
| 8,806,772 B1 | 8/2014 | Schaefer, Jr. | |
| 9,380,925 B2 * | 7/2016 | Eichholz | A47L 15/486 |
| 9,683,955 B2 | 6/2017 | Bloemendaal et al. | |
| 11,634,856 B2 * | 4/2023 | Bocchino | D06F 58/22 |
| | | | 34/82 |
| 11,740,021 B2 * | 8/2023 | Iglauer | B60S 3/002 |
| | | | 34/666 |
| 2011/0271549 A1* | 11/2011 | He | C02F 11/12 |
| | | | 34/79 |
| 2018/0094378 A1* | 4/2018 | Xu | D06F 25/00 |
| 2023/0270226 A1* | 8/2023 | Han | H02K 7/14 |
| | | | 34/97 |
| 2023/0296316 A1* | 9/2023 | Iglauer | F26B 15/16 |
| | | | 34/68 |

FOREIGN PATENT DOCUMENTS

| | | | | |
|---|---|---|---|---|
| CA | 2963992 A1 | | 8/2018 | |
| CN | 103080410 B | * | 10/2015 | ........... D06F 43/085 |
| DE | 19700646 C1 | | 4/1998 | |
| DE | 102011117734 A1 | * | 2/2013 | ........... A47L 15/481 |
| DE | 102015214706 A1 | * | 2/2017 | ........... B05D 3/0413 |
| EP | 2112448 A3 | | 5/2013 | |
| GB | 765910 A | | 1/1957 | |
| GB | 1142471 A | | 2/1969 | |
| WO | WO-2012023824 A2 | * | 2/2012 | ........... D06F 43/085 |
| WO | WO-2017021324 A1 | * | 2/2017 | ........... B05D 3/0413 |

OTHER PUBLICATIONS

DryAir website located at https://dryair.ca/agriculture/https://adaptiveagriculture.ca/heaters--ducting.html (last accessed Jul. 1, 2021).

George Orido et al., "Grain Drying Simulation in a GT-380 Dryer using Energy Recovered from ICE Exhaust," IOSR Journal of Agriculture and Veterinary Science (IOSR-JAVS), vol. 10, Issue 6, Ver. II, pp. 1-6 (Jun. 2017).

Office Action issued in Canadian Application No. 3,163,811 on Oct. 20, 2023.

* cited by examiner

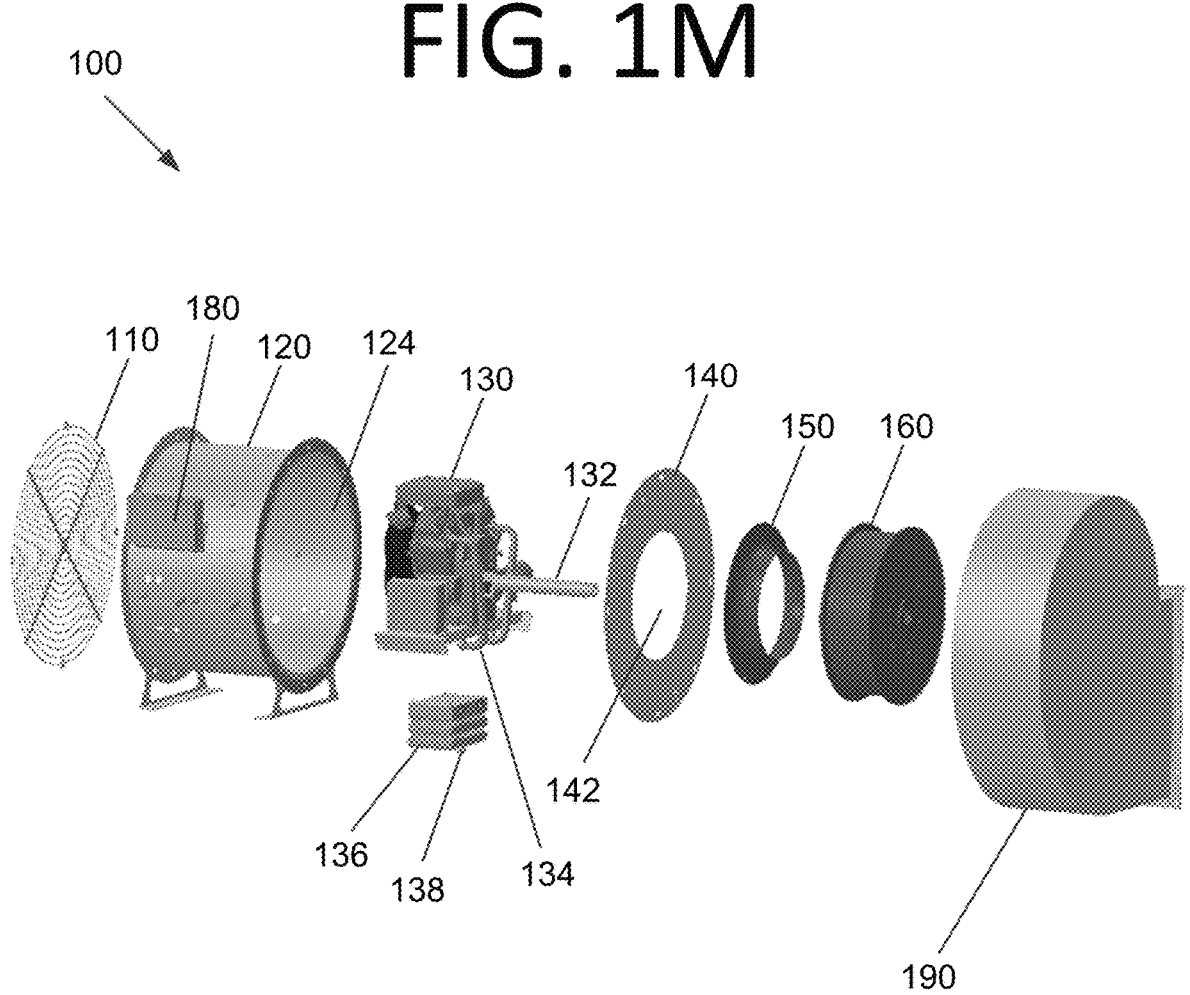

PORTABLE GRAIN CONDITIONERS

FIELD

The present invention generally relates to grain conditioning, and more specifically, to portable grain conditioners that operably connect to a grain bin or silo and blow heated air through the crop to dry the crop or blow ambient temperature air through the crop to cool it.

BACKGROUND

Traditionally, crops such as wheat, barley, canola, corn, and the like are harvested in a relatively dry state from a field. Each crop has a different moisture content and temperature at which it is considered dry and safe for storage. Crops that are harvested dry are often stored in grain bins or silos prior to being sold. One reason to store grain in a bin or silo is to simplify harvest logistics, which frees up manpower for harvesting activity by minimizing the need for transporting the grain to a terminal or other collection point. Another reason for storing grain in a bin or silo is to be able to monitor grain markets and sell the grain when prices are higher, yielding a higher financial return.

Factors such as higher yielding crops requiring more growing days, changing climate conditions, and farm sizes becoming larger make harvest of crops in a dry state more difficult. This means such crops must then be dried to a moisture content that is safe for storage and the grain must also be cooled to a temperature that is safe for storage. If the grain is not brought to a sufficiently dry and cool state, it creates the potential of insect infestation and/or grain spoilage. If grain cannot be put into a safe storage state, harvest may have to be delayed, which is often undesirable.

To put grain into a safe storage state, grain dryers or aeration bins are traditionally used. Grain dryers are large machines that are typically in a central location. Grain must be moved to the dryer and then away from the dryer as it is dried. This requires management to move the grain as it becomes dry. Doing this during the busy harvest period is undesirable, but necessary with such a device. Dryers also take time, which limits the amount of grain that can be harvested in damp conditions because grain cannot be harvested much faster than the dryer can dry the grain. A grain dryer uses hot air, which can also damage some crops.

In situations where the grain is within one or two percentage points of the dry storage moisture content, the grain can be put into an aeration bin. Aeration bins are storage bins that have one or multiple fans connected to them to blow air through the grain. The aeration fans are typically connected to an electric motor and blow ambient air through the grain. Thus, this air could be heating or cooling the grain depending on the ambient air temperature. Depending on the conditions, it is possible for some drying to occur with aeration bins, but the drying is limited due to the low air flow and relying on the ambient conditions. In some situations, using aeration during high humidity times can cause some rewetting of the grain.

Often, aeration bins are used to keep grain in a safe state until it can be transferred to the grain dryer or sold. One way to do this in cooler climates is to cool the grain or sometimes freeze the grain. This is done because grain spoilage is caused by heat and moisture, so by reducing the temperature in high moisture grain, the likelihood of spoilage is reduced. One limitation of aeration bins is that the airflow is typically too low to adequately dry the grain. Another is that the electric motors require a substantial amount of power. Thus, in yards where there are many grain bins, it may not be possible to start all bin fans at the same time. Furthermore, for remote yard sites that do not have electricity, it is not possible to use traditional aeration fans. The electric motors used in aeration fans do not generate large amounts of heat, so the only way to add heat with an aeration fan is to add a heater to the airflow. Accordingly, an improved approach to grain conditioning inside grain bins may be beneficial.

SUMMARY

Certain embodiments of the present invention may provide solutions to the problems and needs in the art that have not yet been fully identified, appreciated, or solved by current grain aeration and drying technologies. For example, some embodiments of the present invention pertain to portable grain conditioners that operably connect to a grain bin or silo and blow heated air through the crop to dry the crop or blow ambient temperature air through the crop to cool it.

In an embodiment, a grain conditioning apparatus includes a motor housing configured to house a motor and an impeller housing configured to house an impeller. The grain conditioning apparatus also includes a housing adapter plate located between the motor housing and the impeller housing. The housing adapter plate includes an opening. The impeller housing is configured to directly or indirectly funnel air to a grain bin or silo.

In another embodiment, a grain conditioning apparatus includes a motor housing and a motor located within or at least partially covered by the motor housing. The grain conditioning apparatus also includes an impeller housing configured to house an impeller and an impeller located within or at least partially covered by the impeller housing. The grain conditioning apparatus further includes a housing adapter plate located between the motor housing and the impeller housing. The housing adapter plate includes an opening. Additionally, the grain conditioning apparatus includes a shaft operably connected to the motor and the impeller such that when the motor rotates the shaft, the motor also rotates the impeller. The shaft passes through the opening of the housing adapter plate. The impeller housing is configured to directly or indirectly funnel air to a grain bin or silo.

In yet another embodiment, an apparatus includes a motor housing configured to house a motor. The motor housing also includes a heat exchanger. The motor housing and heat exchanger are configured to house and operably connect to a plurality of different motors, respectively. The apparatus also includes an impeller housing configured to house an impeller. A size and shape of the impeller housing correspond to an impeller designed to operate with a motor of the plurality of different motors. The apparatus further includes a housing adapter plate located between the motor housing and the impeller housing. The housing adapter plate includes an opening. The motor housing and the impeller housing are operably connected to the housing adapter plate.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1M is an exploded perspective view illustrating the portable grain conditioner with a centrifugal impeller housing, according to an embodiment of the present invention.

FIG. 1O is another partially transparent assembled perspective view illustrating the portable grain conditioner with the centrifugal impeller housing, according to an embodiment of the present invention.

Unless otherwise indicated, similar reference characters denote corresponding features consistently throughout the attached drawings.

DETAILED DESCRIPTION OF THE EMBODIMENTS

Figure 1A:
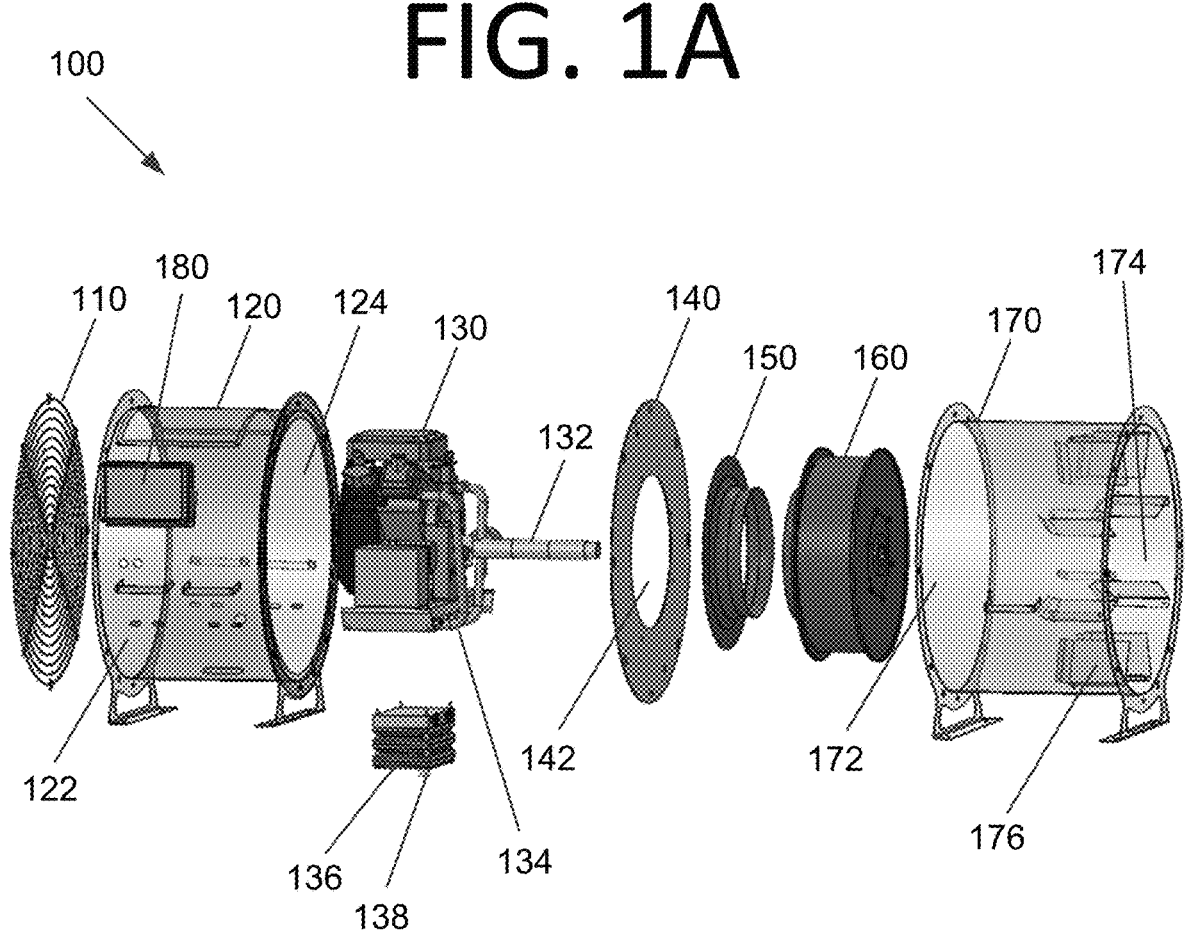
FIG. 1A is an exploded perspective view illustrating a portable grain conditioner with an inline impeller housing, according to an embodiment of the present invention.

Some embodiments pertain to potentially off-grid grain conditioners that can be operably connected to an aeration grain bin or silo to blow heated air through the crop to dry the crop or to blow ambient temperature air through the crop to cool it. A fan may be powered by an internal combustion engine (e.g., one that burns gasoline, diesel, kerosene, natural gas, propane, any other suitable combustible hydrocarbon, ethanol, etc.), an electric motor, or any other suitable motor in some embodiments without deviating from the scope of the invention. The engine may be mounted inside the air stream to allow the heat from the motor to be collected and forced into the airstream that is blown into the grain bin without allowing exhaust gases to be directed into the grain bin. In some embodiments, the engine exhaust has the possibility to be routed through an air exchanger to remove heat from the exhaust and direct heat into the grain bin. In certain embodiments, if the exhaust is not routed through the heat exchanger, the exhaust is put into the atmosphere without capturing any of the heat, which allows the fan to operate in a cooling mode. The ability to have the exhaust flow through the air exchanger or directly to the atmosphere may be controlled with a valve, a cover, a latch, or any other suitable mechanism without deviating from the scope of the invention. The motor of some embodiments can be mounted inline with the fan like a traditional inline aeration fan, or it can be mounted to the side like a side mounted centrifugal aeration fan.

The grain conditioner can operate in and switch between a heating mode and a cooling mode in some embodiments. In heating mode, the airflow may be directed over the heat exchanger to warm the air. For example, the exhaust from the motor may travel through a heat exchanger that is located within the fan airflow. This heat exchanger further warms the air. By warming the air, the drying capacity is increased, therefore allowing the system to more effectively dry the grain in the bin.

In the cooling mode, air is not passed through the heat exchanger, therefore allowing ambient air to be passed through the bin. In certain embodiments, the cooling capabilities may be augmented with an air conditioner. Cooling mode may be used when ambient air temperatures are lower, reducing the ability for drying to occur within the bin. By allowing cool air to be pushed through, the grain will be cooled to a lower temperature or possibly frozen, which reduces the likelihood of grain spoilage.

The fan can be operated in manual or automatic mode in some embodiments. In manual mode, an operator manually starts or stops the fan. This may be done by starting or stopping the engine. The engine may be controlled manually by pulling a starting rope, flipping an ignition switch, through a smartphone application, desktop application, or web page that communicates with the engine and allows it to be started remotely from anywhere in the world, or by any other suitable mechanism without deviating from the scope of the invention.

If the bin is outfitted with temperature and moisture cables, the operation of the grain conditioner may be automated by utilizing the sensor information to determine when to turn the engine/fan on or off. The control system may be setup to cool the grain or dry it, depending on user preference. The control system may be configured to automatically provide warm, ambient, or cool air to the grain based on the type of crop and the sensed moisture content.

Figure 1B:
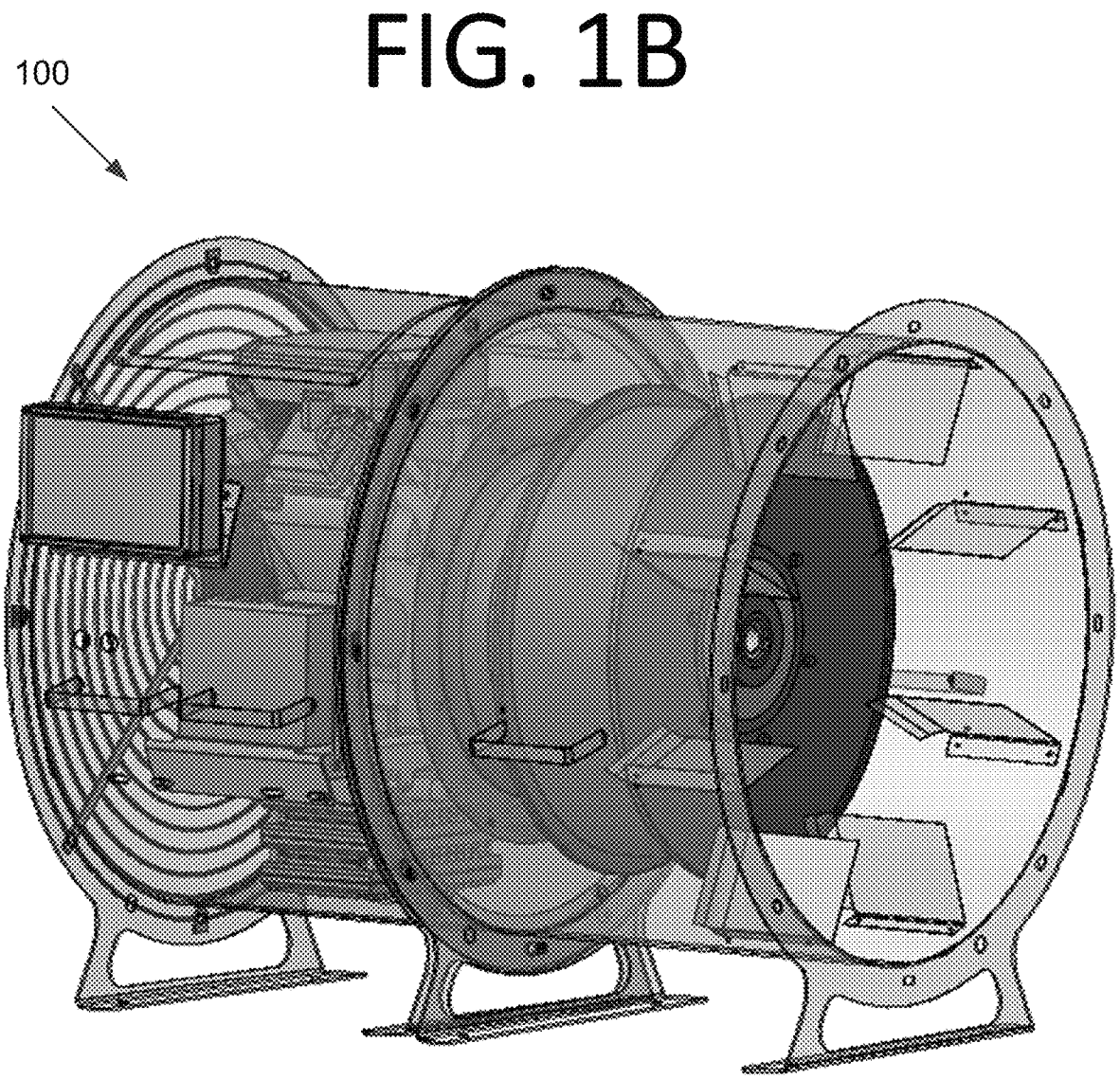
FIG. 1B is a partially transparent assembled perspective view illustrating the portable grain conditioner with the inline impeller housing, according to an embodiment of the present invention.
Figure 1C:
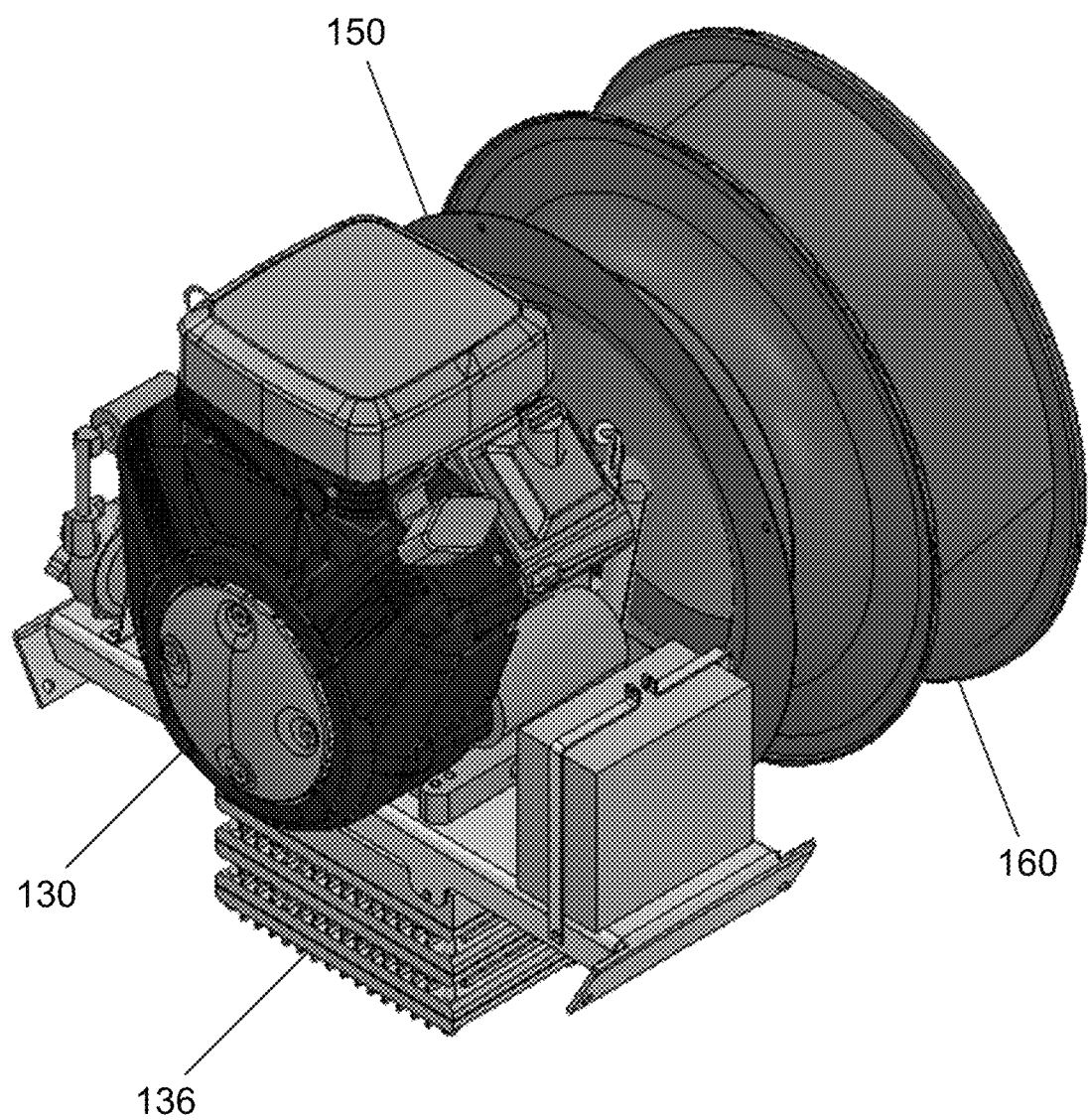
FIG. 1C is an enlarged perspective view of the motor, impeller, and heat exchanger of the portable grain conditioner, according to an embodiment of the present invention.
Figure 1D:
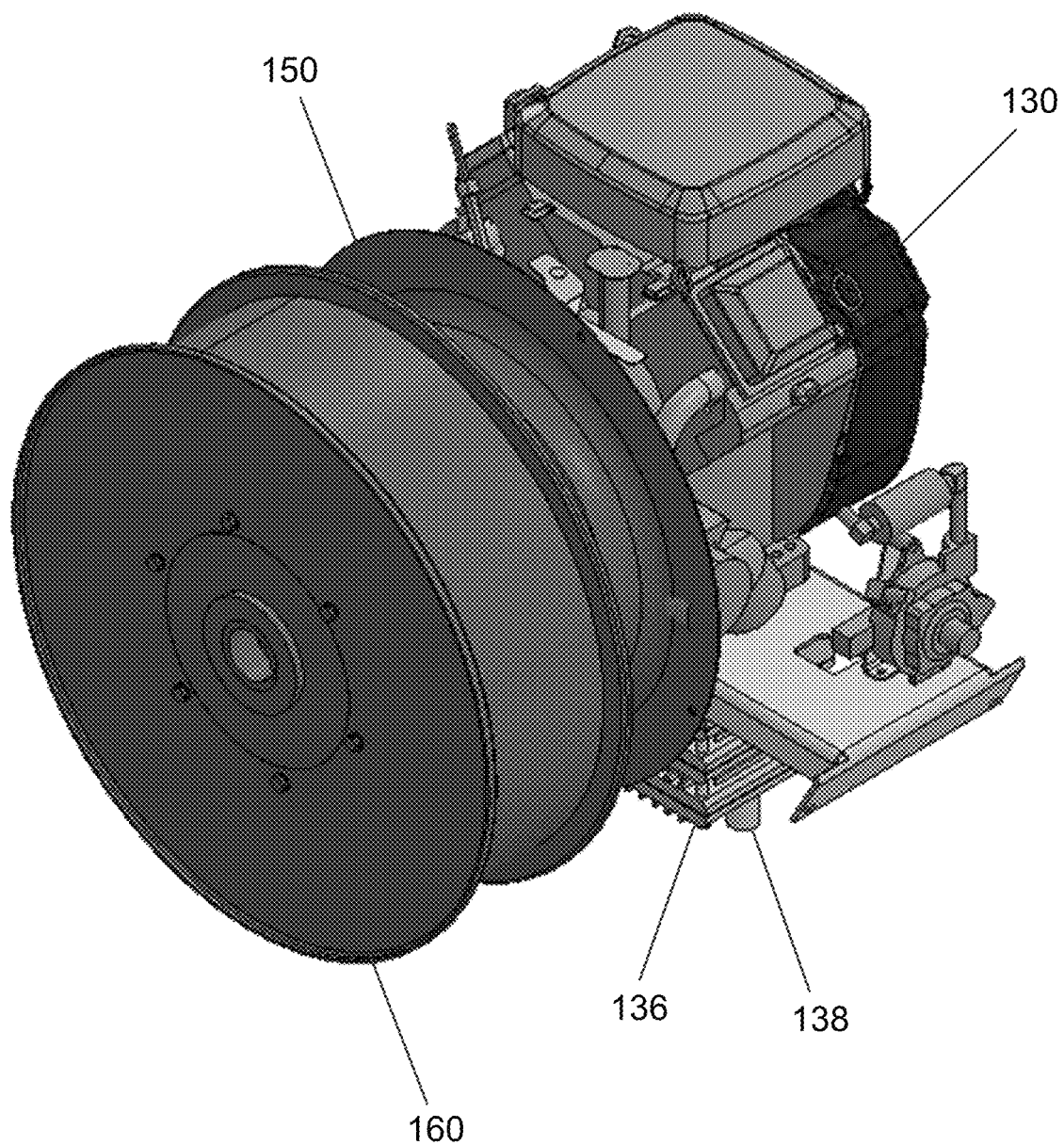
FIG. 1D is another enlarged perspective view of the motor, impeller, and heat exchanger of the portable grain conditioner, according to an embodiment of the present invention.
Figure 1E:
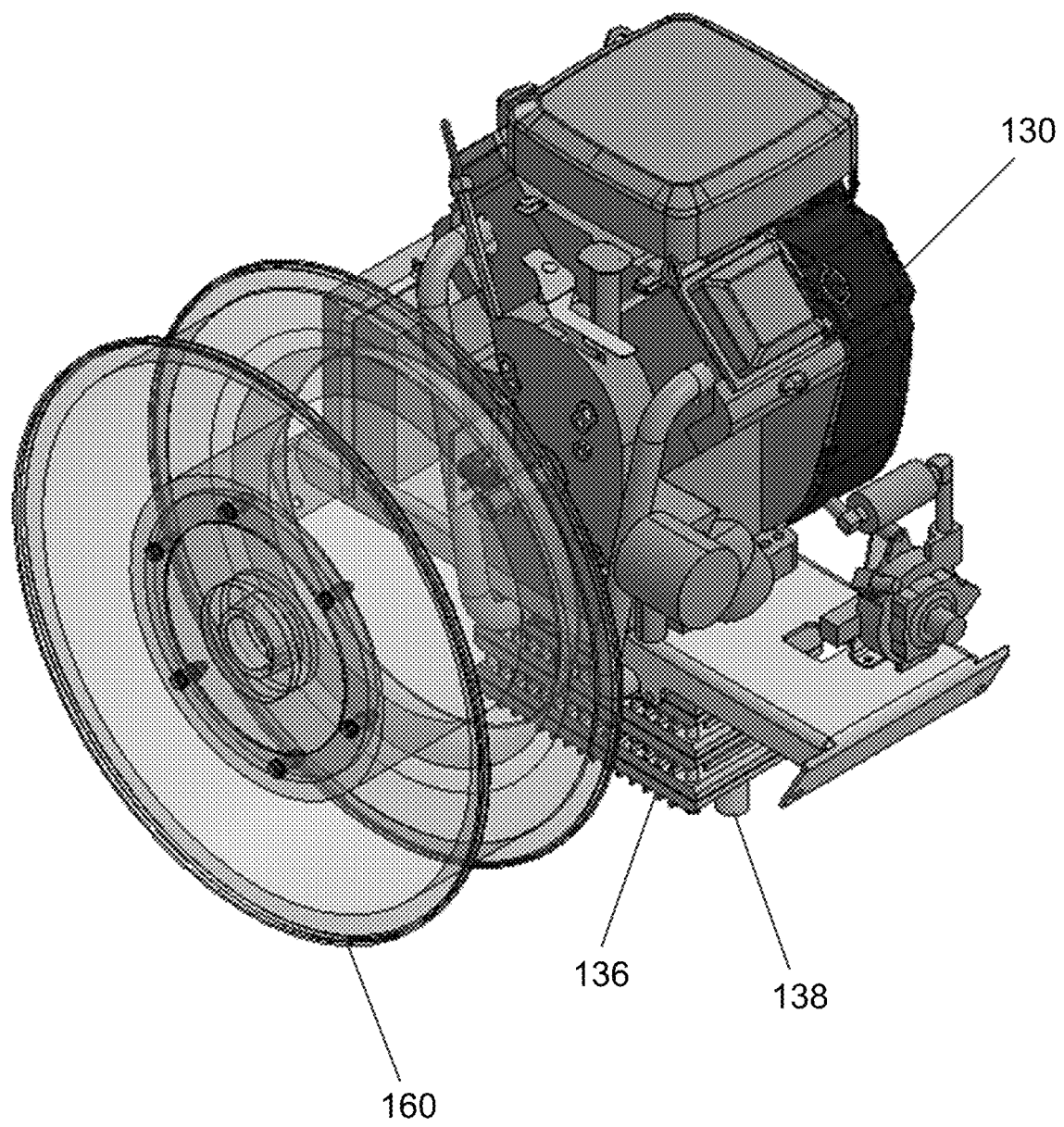
FIG. 1E is the enlarged perspective view of the motor, impeller, and heat exchanger of FIG. 1D with the impeller shown as being semi-transparent, according to an embodiment of the present invention.

FIG. 1A is an exploded perspective view and FIG. 1B is a partially transparent assembled perspective view illustrating a portable grain conditioner 100 (also called a "grain conditioning apparatus" herein), according to an embodiment of the present invention. A screen 110 covers an opening 122 of a motor housing 120 that is exposed to the outside air. A motor 130 resides within motor housing 120. Enlarged views of motor 130 are provided in FIGS. 1C-E. A controller 180 (e.g., a computing system that includes a processor, memory, and an interface (e.g., switches, light emitting diodes (LEDs), buttons, a display that may include a haptic interface, any combination thereof, etc.)) is configured to control the operation of motor 130. A housing adapter plate 140 is located between another opening 124 of motor housing 120 and an opening 172 of an inline impeller housing 170. In some embodiments, housing adapter plate 140 is integrated with motor housing 120, inline impeller housing 170, or centrifugal impeller housing 190. In certain embodiments, both housings, and potentially housing adapter plate 140, are a single piece. An impeller 160 and an impeller shroud 150 are located within inline impeller housing 170. Inline impeller housing 170 includes blades 176 that help to direct air flow.

A shaft 132 of motor 130 extends through an opening 142 in housing adapter plate 140 and impeller shroud 150. Shaft 132 is operably connected to impeller 160 such that impeller 160 rotates when shaft 132 rotates. Thus, in operation, impeller 160 pulls outside air over motor 130, through impeller 160, and on through inline impeller housing 170 and out of opening 174 into a grain bin or silo. In some embodiments, a centrifugal impeller housing 190 with opening 192 may be used instead of inline impeller housing 170. See FIGS. 1M-O.

Unlike existing inline portable grain conditioners, the location of motor 130 and impeller 160 are reversed. This makes the engine easier to access and service, as well as facilitates easier assembly. By reversing the orientation of motor 130 and impeller 160, impeller 160 is positioned in an enclosed housing where a person would have to reach past the motor to access the impeller. This reduces the likelihood of individuals being injured by an operating fan.

Exhaust exits motor 130 into an exhaust manifold 134 that collects exhaust gases from the cylinders of the engine and feeds them to a heat exchanger 136 and then out through an exhaust pipe 138 that extends out of motor housing 120. Thus, exhaust is not mixed with the air flowing into the grain bin. Heat exchanger 136 may be an air-to-air heat exchanger, for example, and is attached to exhaust manifold 134 in this embodiment, or otherwise included in the flow of the exhaust in certain embodiments, to capture heat therefrom.

Engine 130 alone may produce enough heat to dry the grain. However, in some situations where the airflow is high and the ambient temperature is low, it would be beneficial to capture more of the heat from engine 130 to improve drying. Thus, heat exchanger 136 may be used. By capturing heat from the exhaust, more of the energy from running motor 130 (e.g., from combustion) is used instead of allowing energy to escape to the atmosphere as wasted heat. Also, using more heat is typically beneficial, so long as there is sufficient airflow to exhaust the heated air out the grain bin or silo. In some embodiments, heat exchanger 136 is configured to also act as a muffler that reduces acoustic emissions from the motor.

An inline valve (not visible) may be provided to allow the grain conditioning apparatus to either direct the flow of exhaust over the heat exchanger or into the atmosphere. This allows portable grain conditioner 100 to operate in a heating mode or cooling mode, depending on whether the heat exchanger is in the exhaust flow. One efficient technique used in some embodiments to reduce the heat entering the air stream is to simply reduce the engine rotations per minute (RPMs). This can be accomplished by a suitable controller, such as controller 180, for example. This reduces the heat generated by the engine, and therefore, less heat enters the airstream. For drying, high airflow is typically desired. However, for aeration, lower airflows can be used. Lowering the engine RPMs lowers the airflow. However, it also decreases the amount of heat entering the bin or silo.

Figure 1F:
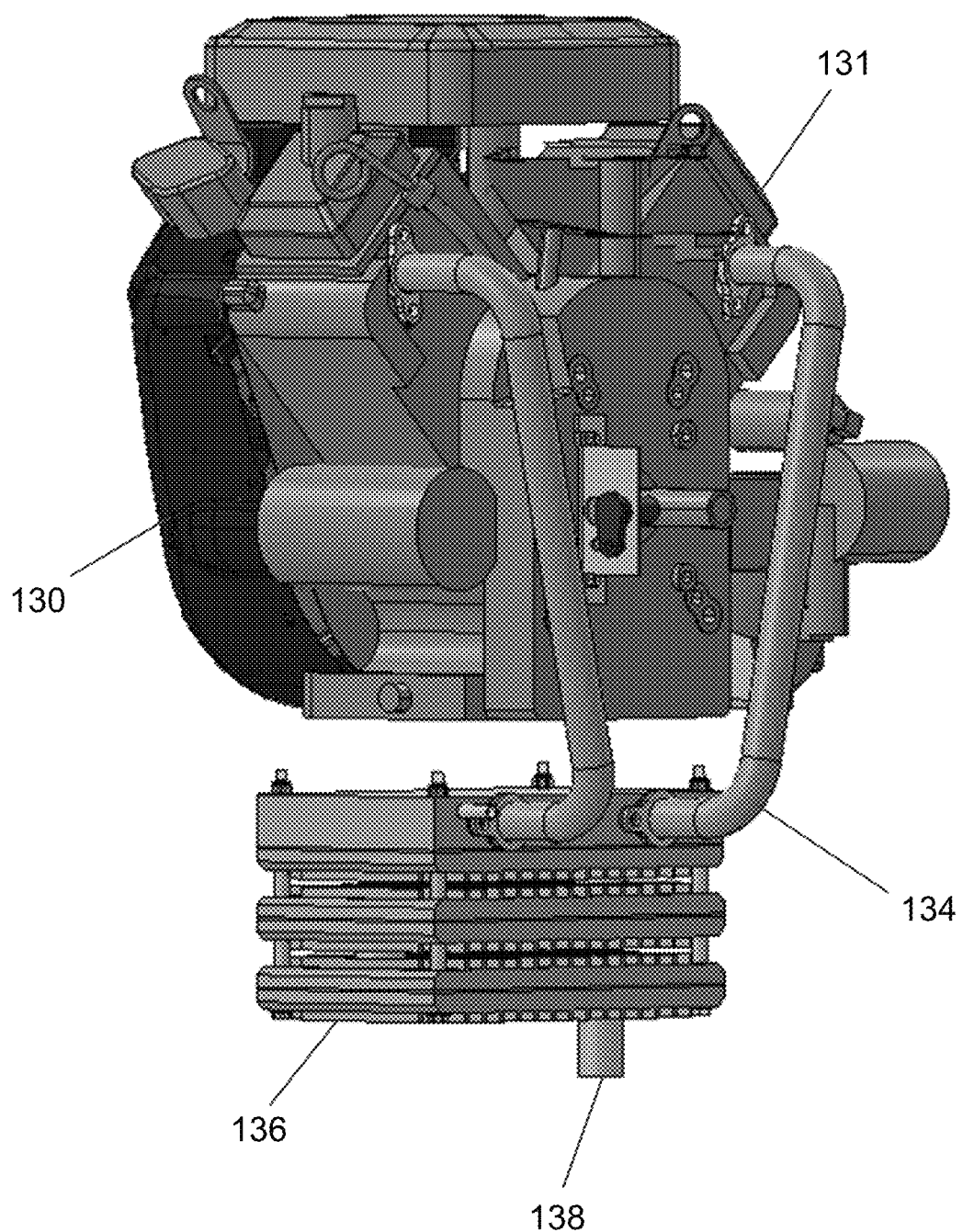
FIG. 1F is a side perspective view illustrating the engine, exhaust manifold, and heat exchanger of the portable grain conditioner, according to an embodiment of the present invention.
Figure 1G:
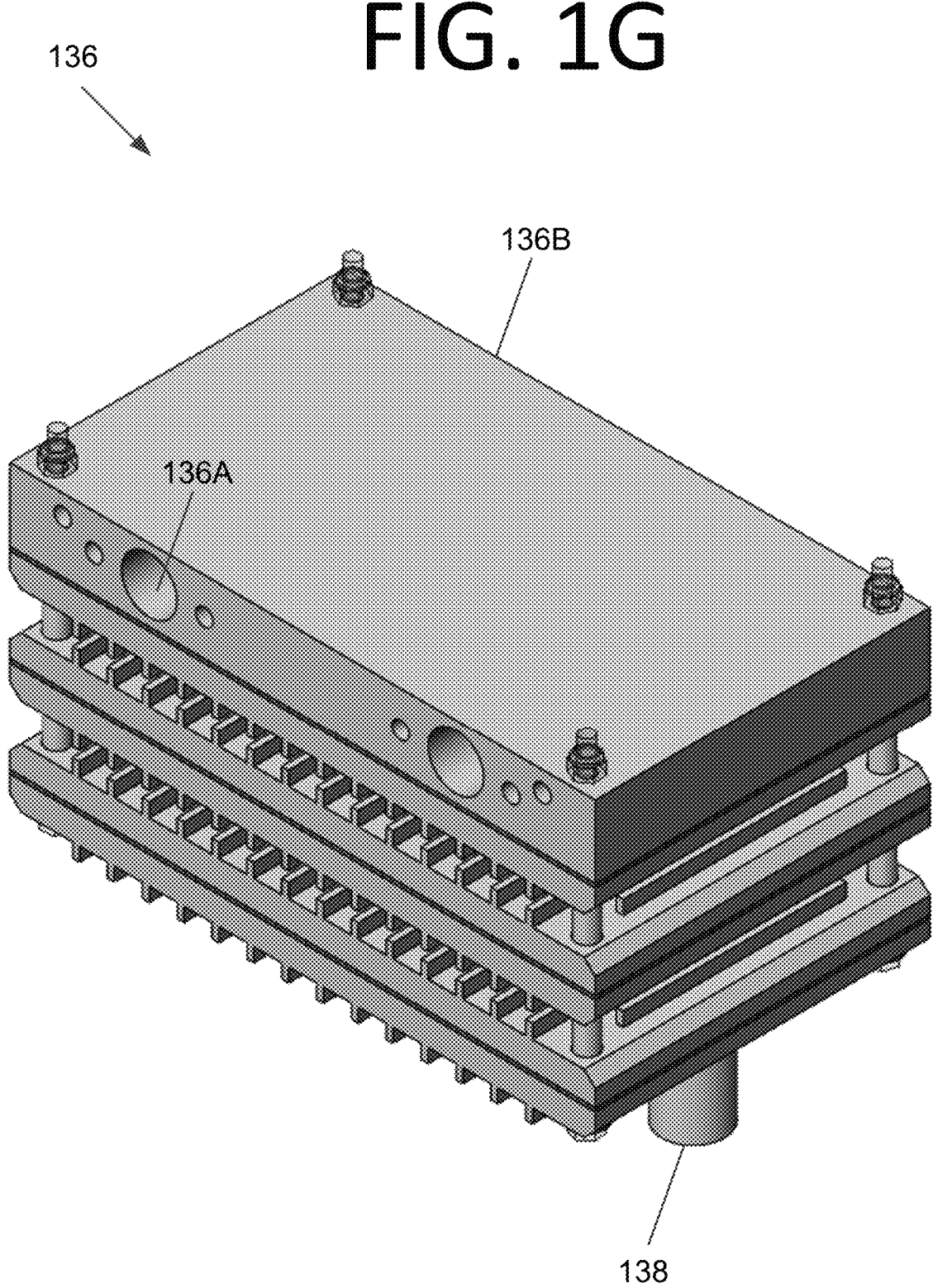
FIG. 1G is a perspective view illustrating the heat exchanger, according to an embodiment of the present invention.
Figure 1H:
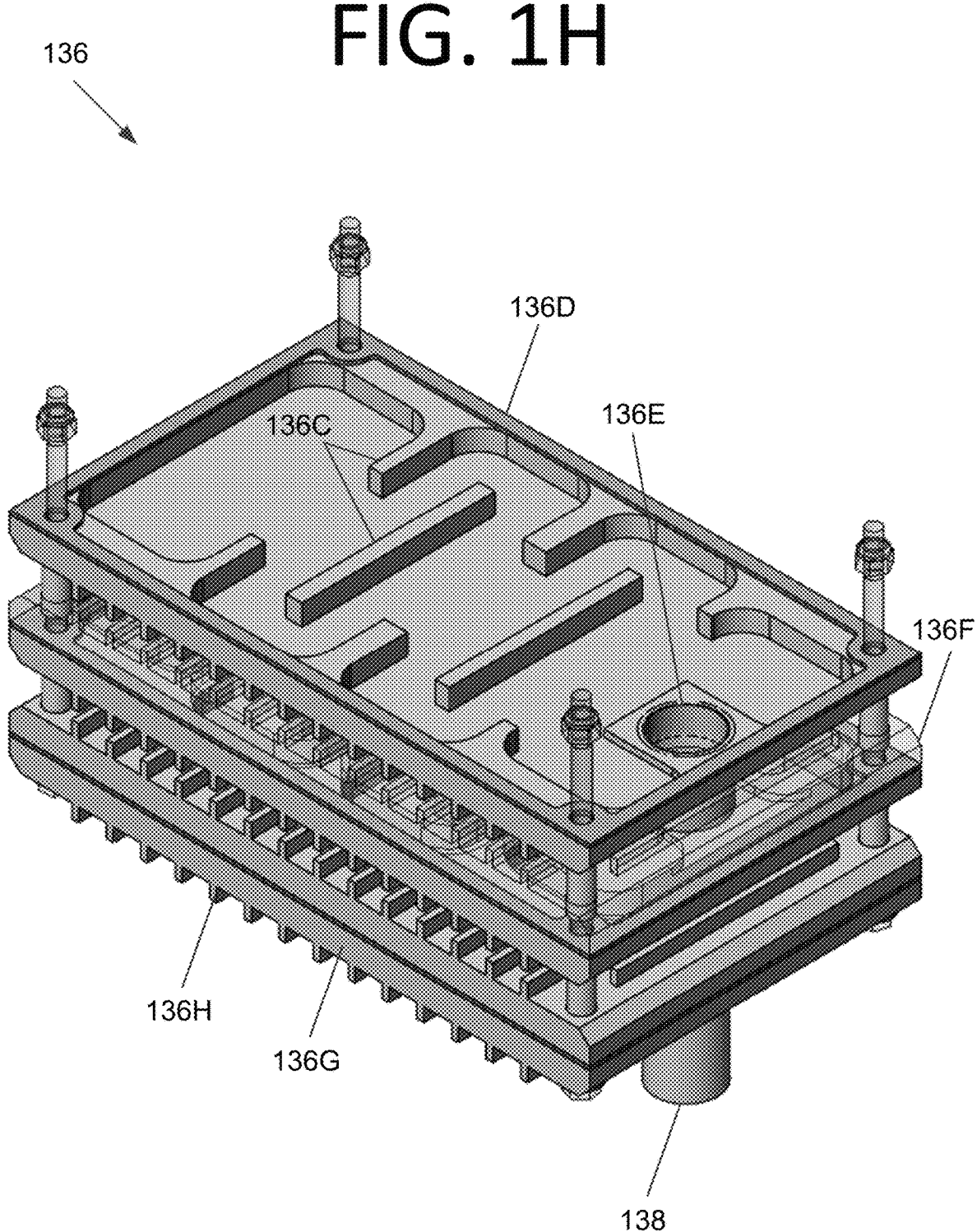
FIG. 1H is a perspective view illustrating the heat exchanger with the top cover removed, according to an embodiment of the present invention.

FIG. 1F is a side perspective view illustrating engine 130, exhaust manifold 134, and heat exchanger 136, according to an embodiment of the present invention. Exhaust manifold 134 connects each cylinder 131 of engine 130 to heat exchanger 136 via manifold inlet ports 136A of top cover 136B of heat exchanger 136. However, other configurations and locations for providing exhaust to heat exchanger 136 may be used without deviating from the scope of the invention. Turning to FIGS. 1G and 1H, which show heat exchanger 136 with top cover 136B included and removed, respectively, exhaust enters one end and winds its way through baffles 136C in lower body 136D of the top layer to get to the other side. Exhaust then exits via port 136E to middle layer 136F and repeats the process in a similar manner for middle layer 136F and then on into bottom layer 136G until exhaust exits bottom layer 136G via exhaust pipe 138. Fins 136H increase the surface area of each layer and help to increase the amount of heat that is captured from the exhaust and radiated into the airflow.

Baffles 136C allow heat exchanger 136 to also act as a muffler. Sound waves bounce within baffles 136C, reducing the amplitude of the sound waves and/or potentially cancelling some of the sound waves out. This also slows the exhaust down and exposes the exhaust to a large surface area, allowing more heat to be transferred from the exhaust to the material of heat exchanger 136 (e.g., aluminum, steel, etc.). The air pulled by impeller 160 is channeled over the different parts of heat exchanger 136, which exposes the air to a relatively large surface area of heat exchanger 136 and helps transfer heat from the material of heat exchanger 136 to the air.

Figure 1I:
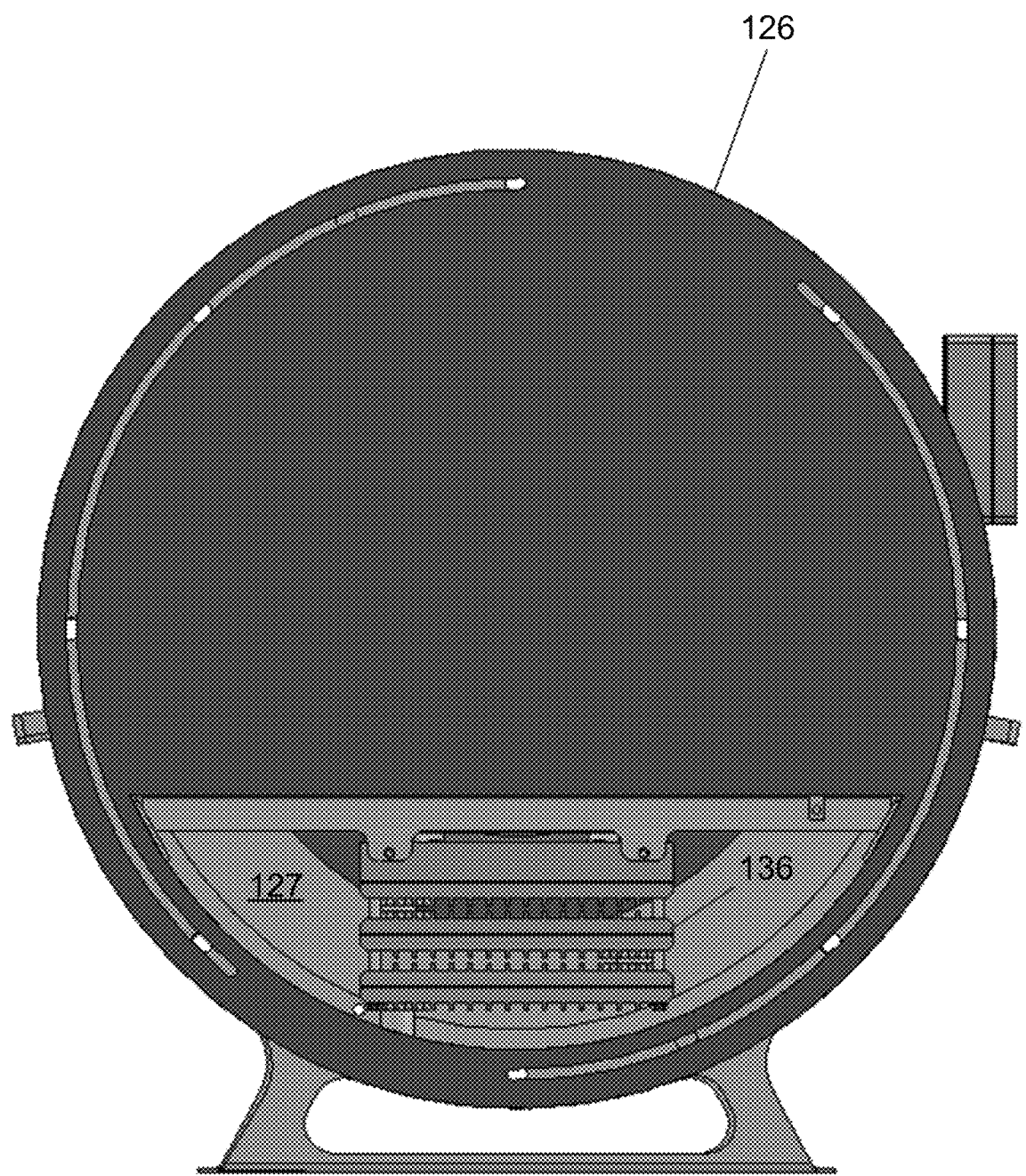
FIG. 1I is a side view illustrating a rotatable cover with the heat exchanger exposed, according to an embodiment of the present invention.
Figure 1J:
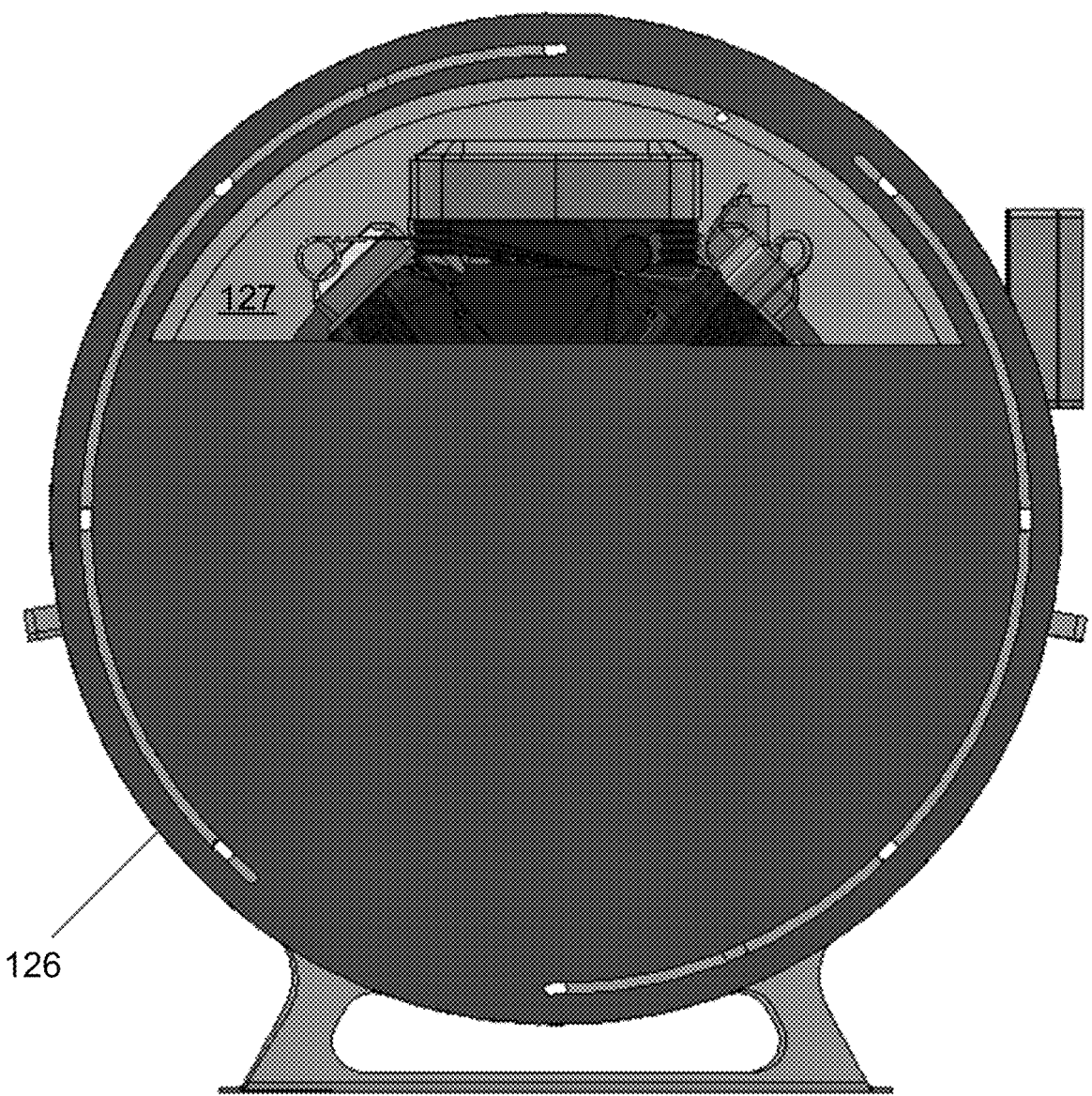
FIG. 1J is a side view illustrating the rotatable cover of FIG. 1I with the heat exchanger covered, according to an embodiment of the present invention.
Figure 1K:
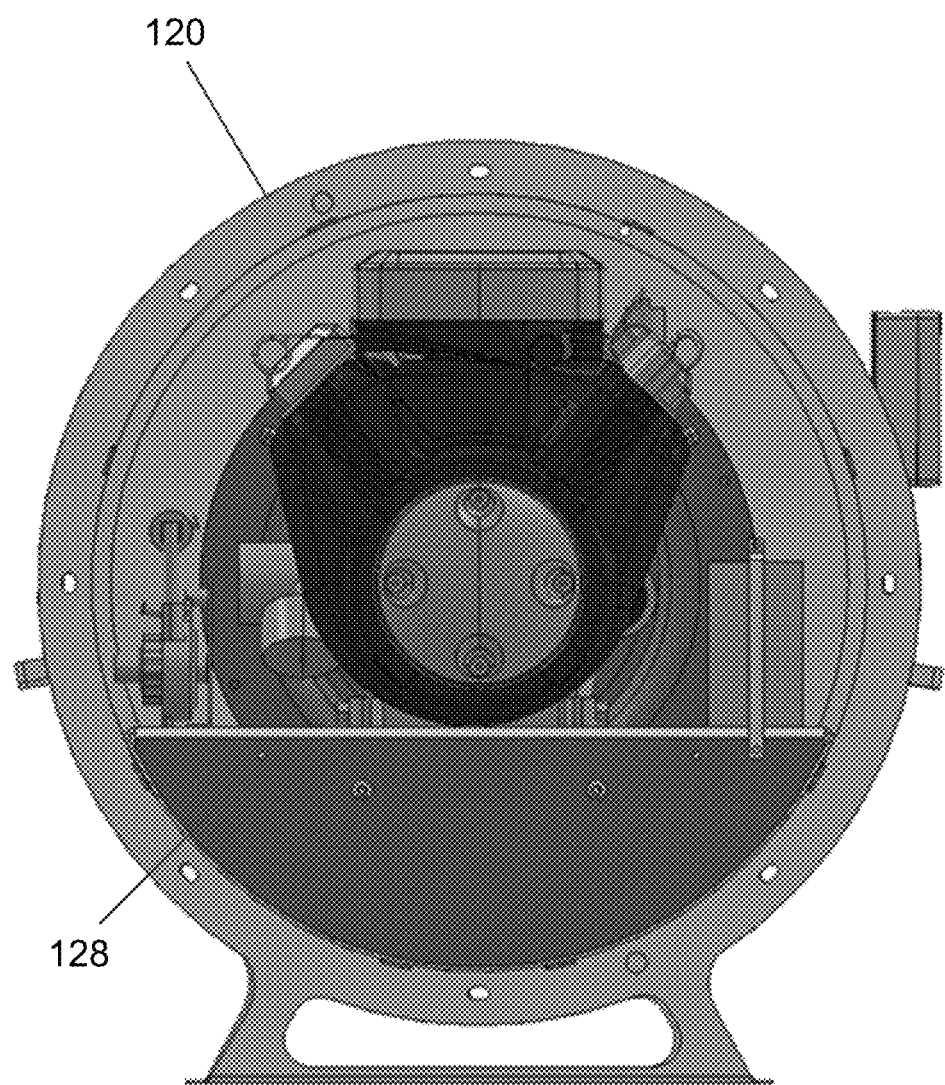
FIG. 1K is a side view illustrating an attachable cover with the heat exchanger covered, according to an embodiment of the present invention.
Figure 1L:
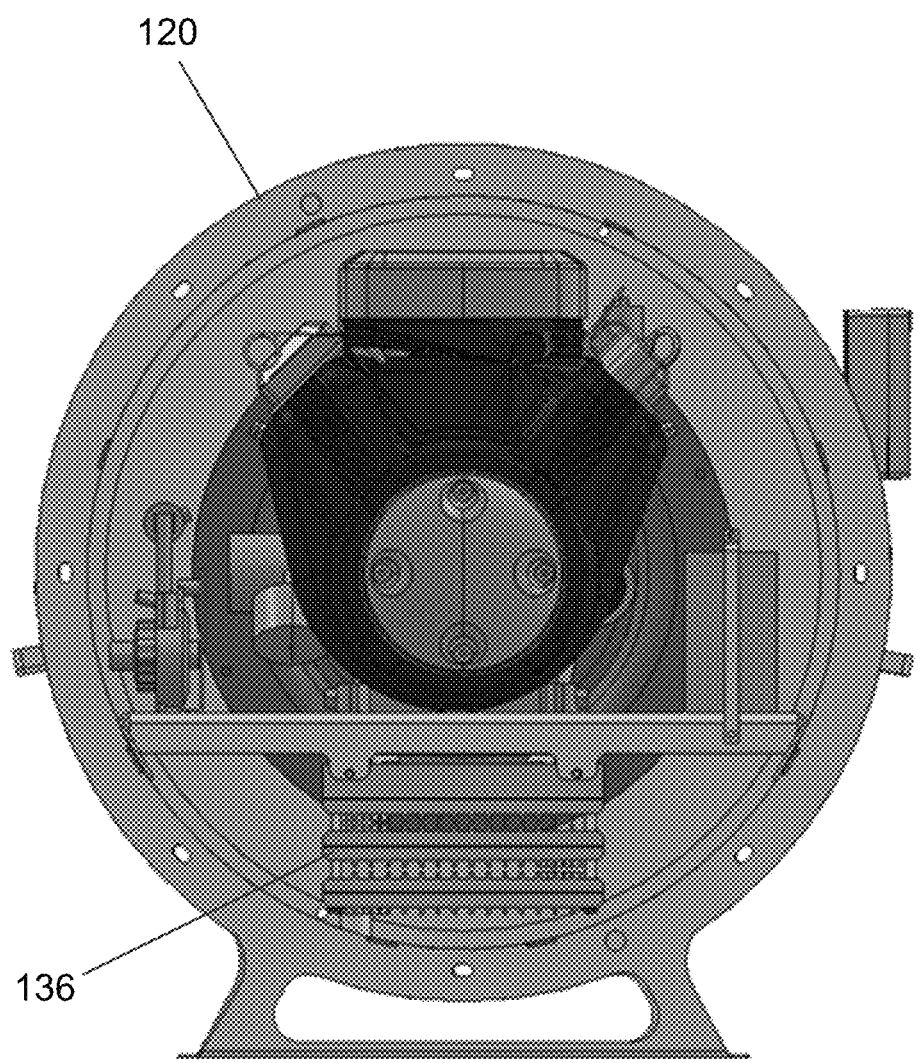
FIG. 1L is a side view illustrating the engine housing with the attachable cover removed, exposing the heat exchanger, according to an embodiment of the present invention.
Figure 1N:
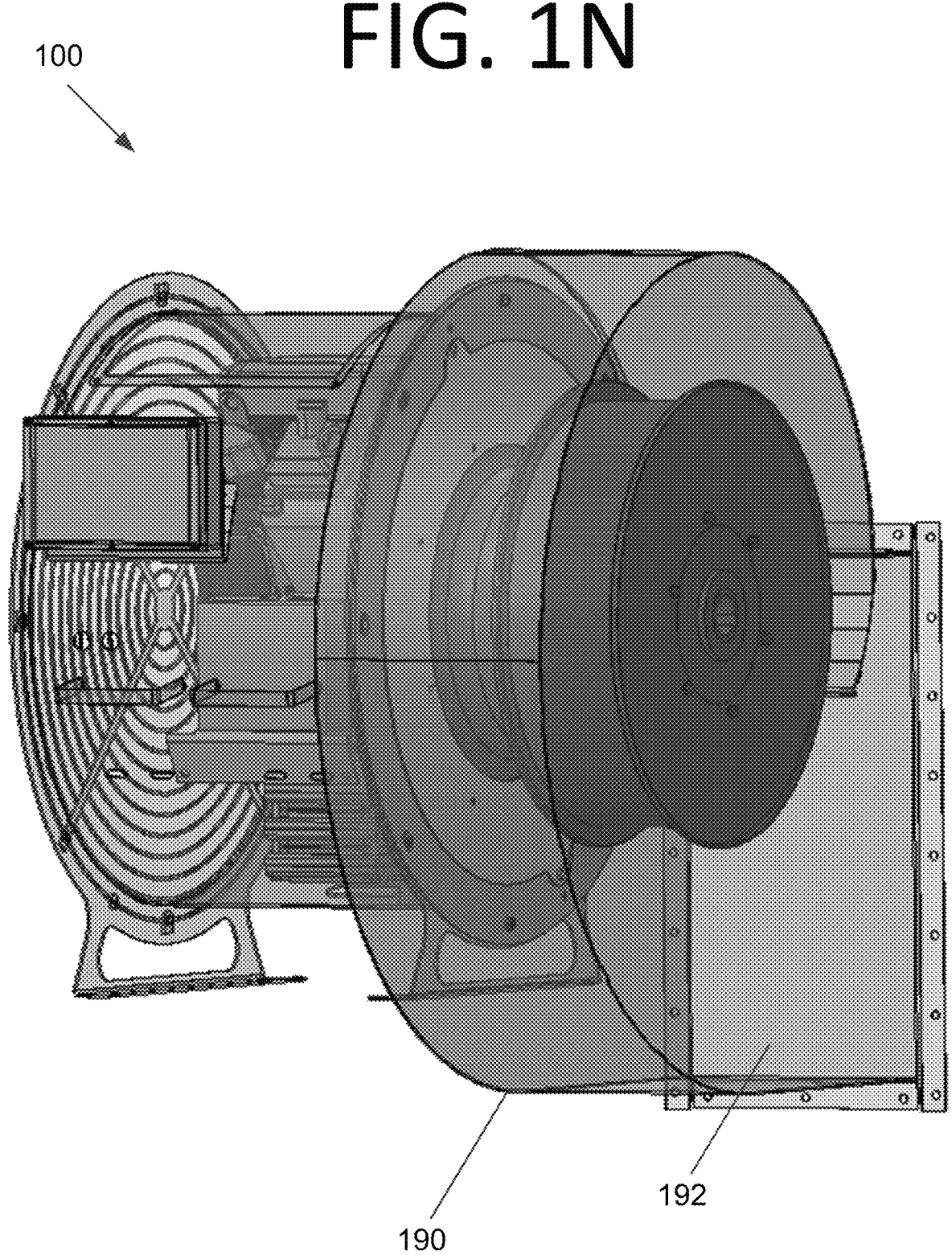
FIG. 1N is a partially transparent assembled perspective view illustrating the portable grain conditioner with the centrifugal impeller housing, according to an embodiment of the present invention.
Figure 10:
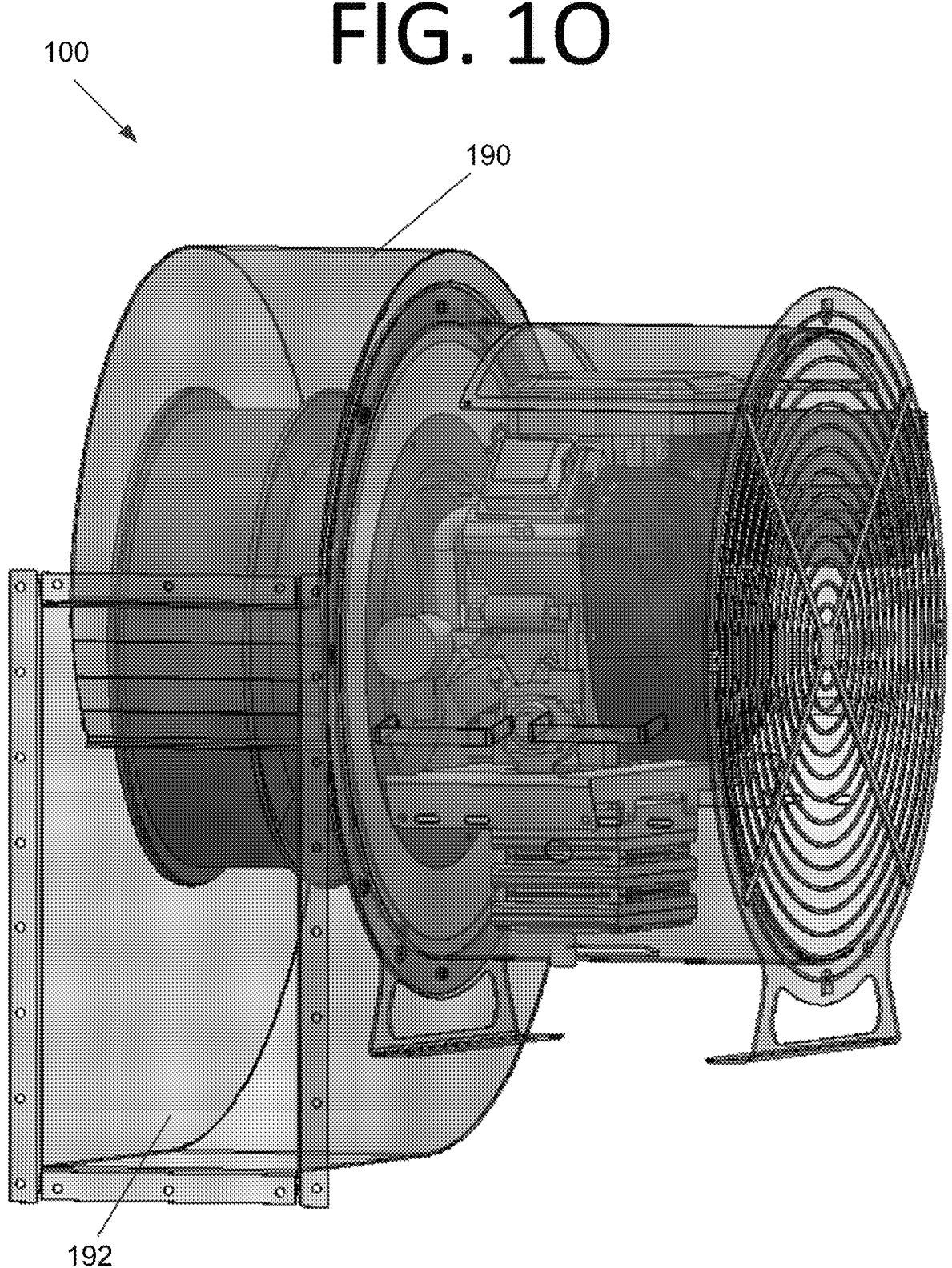

In certain embodiments, a cover is configured to be rotated (FIGS. 1I and 1J) or attached (FIGS. 1K and 1L) to housing adapter plate 140, heat exchanger 136, or both, on the opposite side of motor housing 120 such that an open portion of the cover exposes heat exchanger 136 or a covered portion of the cover shields heat exchanger 136. A rotatable cover 126 with an opening 127 may be used that causes air to flow over heat exchanger 136 and portable grain aerator 100 operates in a heating mode when heat exchanger 136 is exposed via opening 127. See FIG. 1I. When opening 127 is rotated such that heat exchanger 136 is not exposed, portable grain conditioner 100 operates in a cooling mode. See FIG. 1J.

In some embodiments, a cover 128 may be attached as desired. For instance, when cover 128 is attached over heat exchanger 136, portable grain aerator 100 operates in a cooling mode. See FIG. 1K. However, when cover 128 is removed, portable grain aerator 100 operates in a heating mode. See FIG. 1L. However, in some embodiments, a cover may be used in the opposite configuration—namely, to expose heat exchanger 136 when heating is desired similar to a non-rotatable version of FIG. 1I and to cover heat exchanger 136 when cooling is desired similar to FIG. 1J.

Per the above, controller 180 is configured to control operation of motor 130. Controller 180 is configured to automatically start and stop motor 130 based on one or more conditions including, but not limited to, humidity level, time of day, weather conditions, a combination thereof, etc. In some embodiments, the controller is configured to automatically start operation of portable grain conditioner 100 at a certain time of day and automatically stop operation of the grain conditioning apparatus after a period of time. In certain embodiments, the controller is configured to be controlled by a local or web application of an external computing system, such as a smart phone, a laptop computer, a desktop computer, a server, etc. In some embodiments, controller 180 is configured to control motor 130 (e.g., by adjusting the rotation of shaft 132 to a desired speed, by controlling the fuel supply to motor 130, etc.) to control the amount of heat entering the airstream.

Figure 1P:
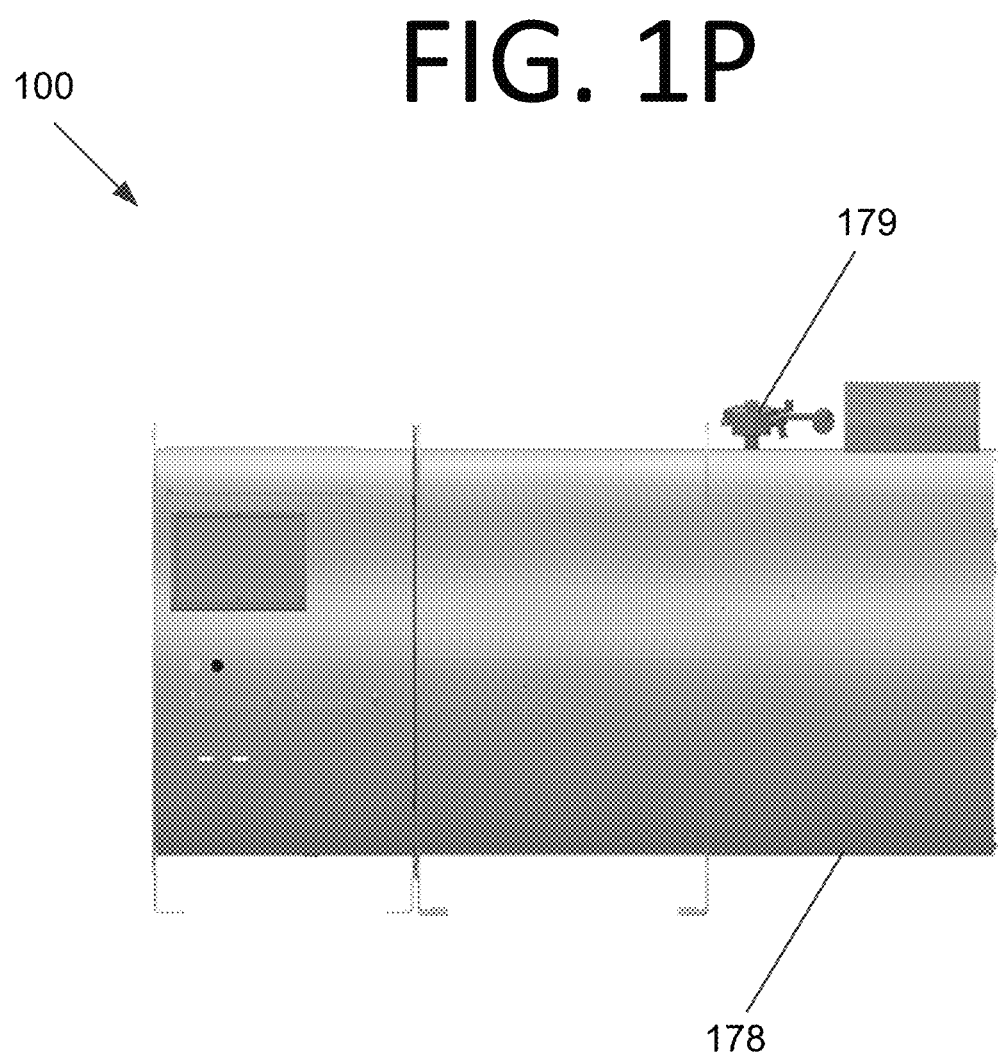
FIG. 1P is an assembled perspective view illustrating the portable grain conditioner with the inline impeller housing and a heater, according to an embodiment of the present invention.
Figure 1Q:
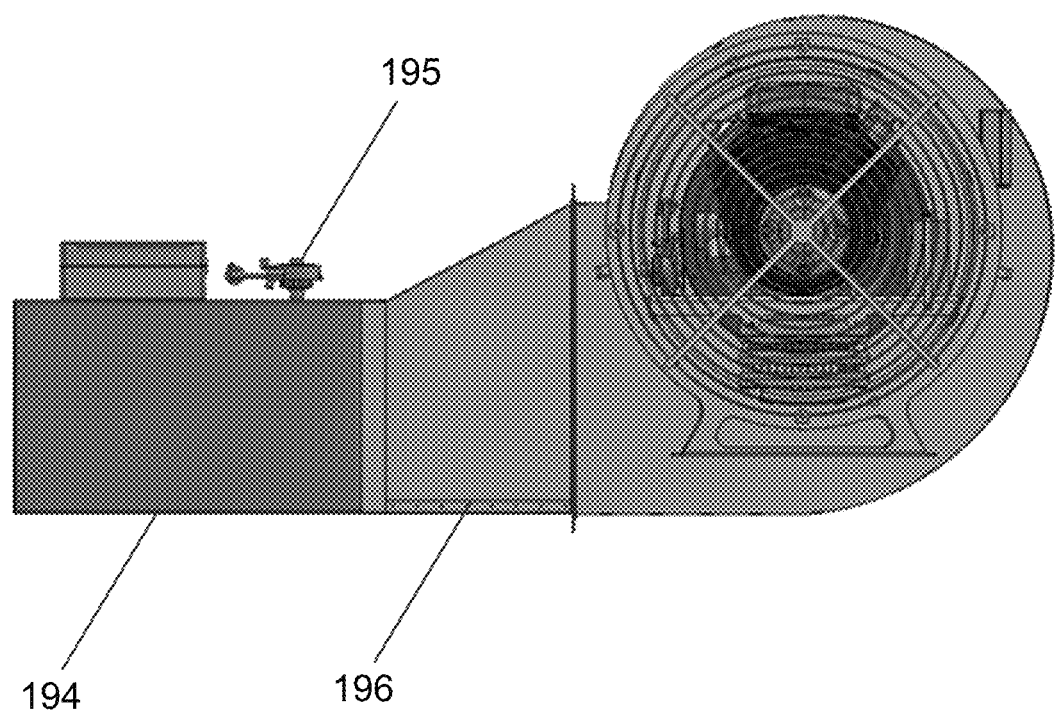
FIG. 1Q is an assembled perspective view illustrating the portable grain conditioner with the centrifugal impeller housing and a heater, according to an embodiment of the present invention.
Figure 1R:
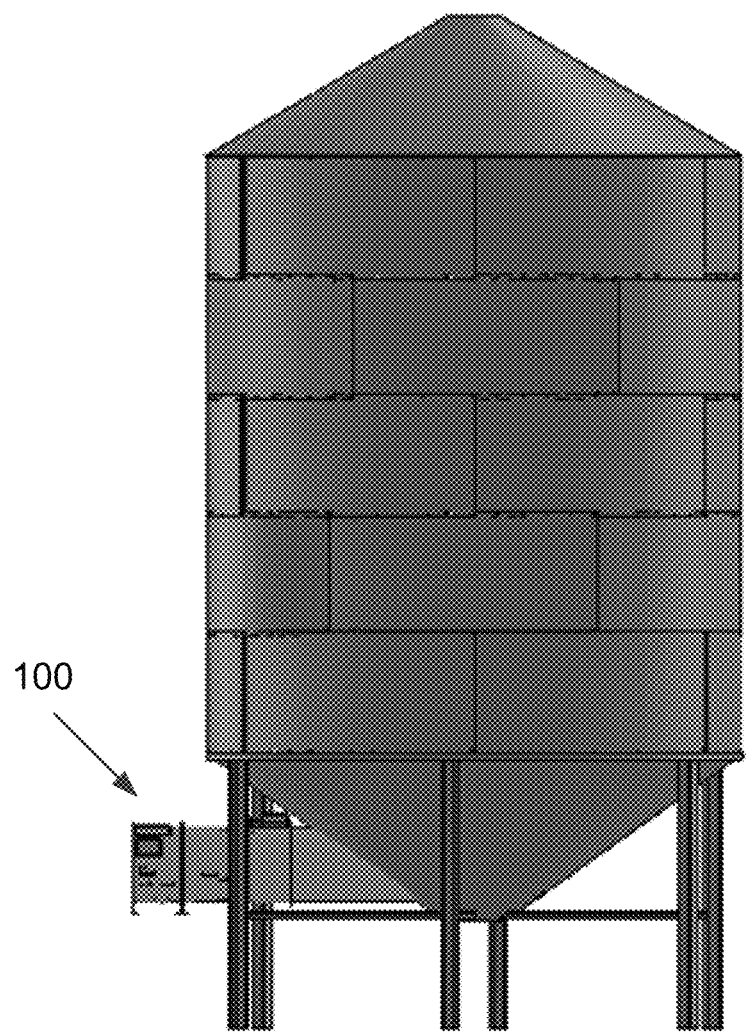
FIG. 1R is a side view illustrating the portable grain aerator with an inline impeller housing connected to a grain bin, according to an embodiment of the present invention.
Figure 1S:
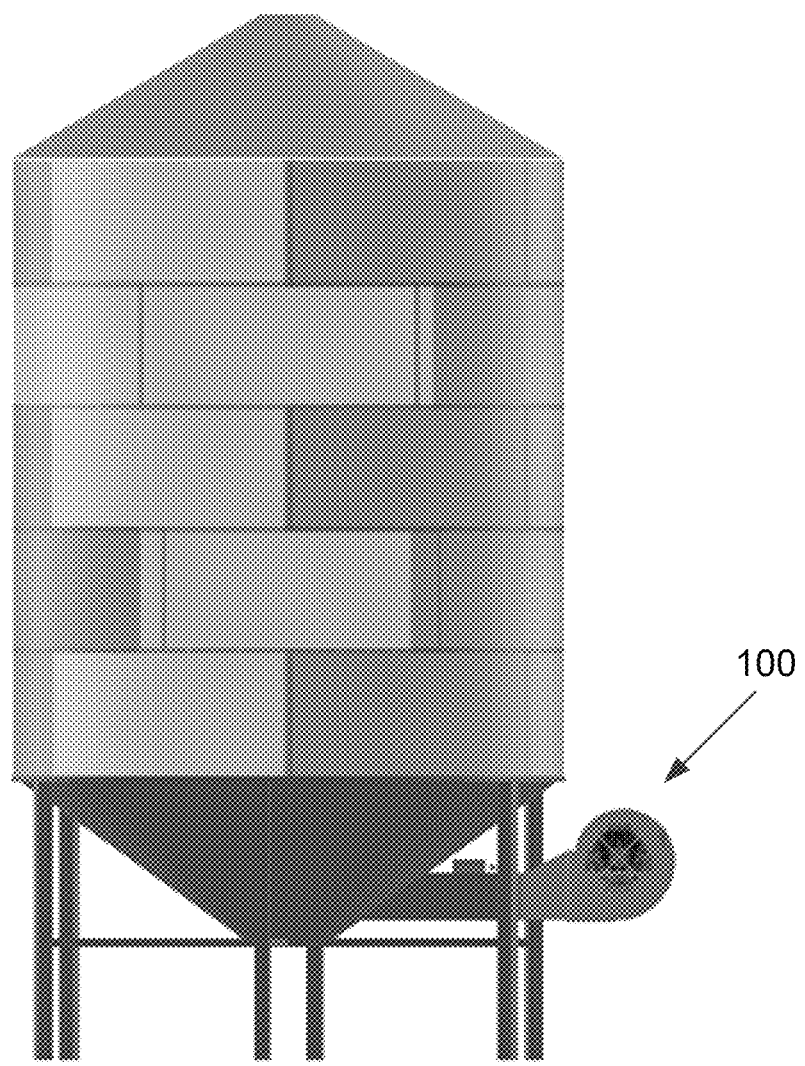
FIG. 1S is a side view illustrating the portable grain aerator with a centrifugal impeller housing connected to the grain bin, according to an embodiment of the present invention.

In some embodiments, at least one additional heat source, such as an electric heater, a propane burner, or the like is located within and/or vented into the motor housing, the impeller housing, or both. FIGS. 1P and 1Q show portable grain aerator 100 with heaters. In FIG. 1P, a heater 178 (here, a burner) is fitted to inline impeller housing 170. A valve 179 controls the flow of fuel to burner 178. In FIG. 1Q, a heater 194 (also a burner) is fitted to centrifugal impeller housing 190 via an adapter 196. A valve 195 also controls the flow of fuel into burner 194.

In some embodiments, motor housing 120 and the heat exchanger are configured to house and operably connect to multiple different motors. In certain embodiments, the size and shape of impeller housing 170 corresponds to an impeller designed to operate with a given motor. Thus, different impeller covers may be used based on the motor, and in certain embodiments, the grain conditioning apparatus may be sold with multiple different covers and/or impellers provided, allowing the user to choose a suitable impeller and motor combination on his or her own.

Figure 2:
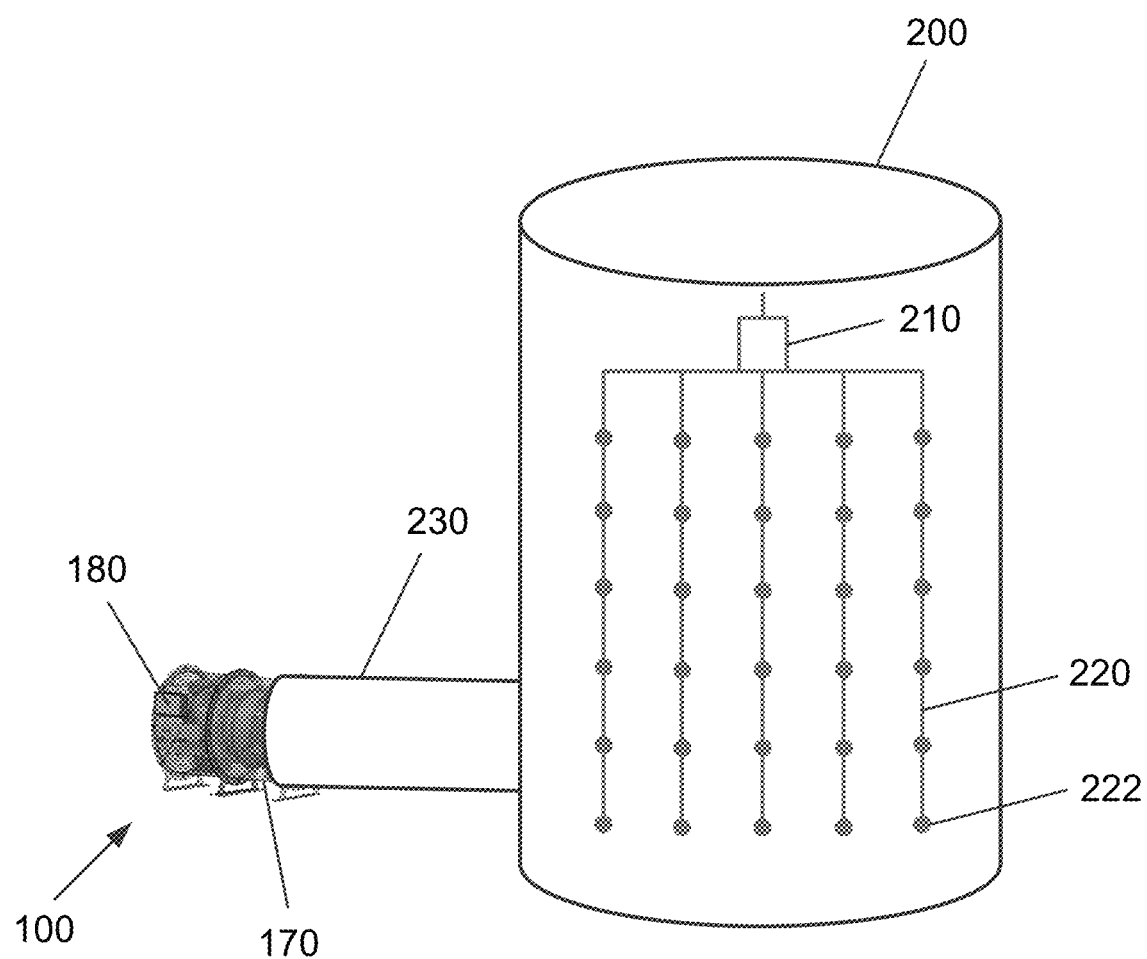
FIG. 2 illustrates the portable grain conditioner connected to a grain bin, according to an embodiment of the present invention.

FIG. 2 illustrates portable grain conditioner 100 connected to a grain bin 200, according to an embodiment of the present invention. A duct 230 connects grain bin 200 to impeller housing 170 (or impeller housing 190) of portable grain conditioner 100. Controller 180 controls operation of portable grain conditioner 100 (e.g., controlling whether motor 130 is on or off, controlling the rotation speed of and/or fuel supply to motor 130, etc.) and is configured to communicate with controller 210 of grain bin 200 directly (e.g., via Bluetooth™) or indirectly (e.g., via a cellular communication network, WiFi, LoRa™, etc.). Sensor lines 220 including sensors 222 detect temperature and humidity at various locations in grain bin 200. However, in some embodiments, controller 210 is not used, and sensors 222 communicate directly with controller 180.

Controller 180 uses the temperature and humidity information, as well as information regarding weather conditions, to determine when to turn motor 130 on and condition the grain in grain bin 200. For instance, controller 180 may stop motor 130 when it is raining so humid air is not blown into grain bin or start motor 130 when the moisture content of the grain is too high. Controller 180 may also control whether portable grain conditioner 100 operates in heating or cooling mode.

Figure 3:
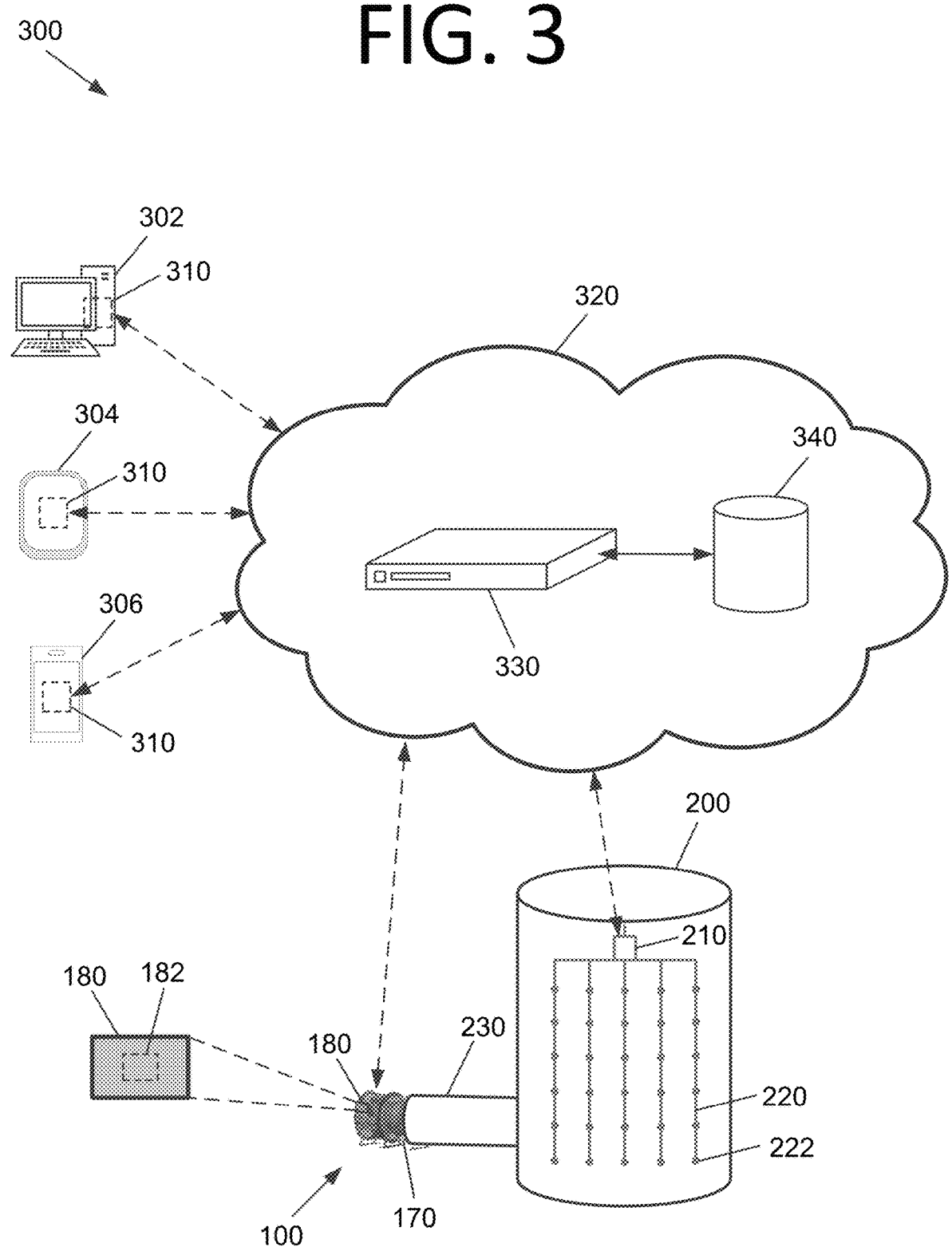
FIG. 3 is an architectural diagram illustrating a grain monitoring and control system, according to an embodiment of the present invention.

FIG. 3 is an architectural diagram illustrating a grain monitoring and control system 300, according to an embodiment of the present invention. Portable grain conditioner 100, grain bin 200, and controllers 180, 210 are included, as well as desktop computer 302, tablet 304, and smart phone 306. However, any desired computing system may be used without deviating from the scope of invention including, but not limited to, smart watches, laptop computers, Internet-of-Things (IoT) devices, vehicle computing systems, etc.

Each computing system 302, 304, 306 has a grain conditioning interface application 310 installed thereon. Grain conditioning interface application 310 is configured to interact with a grain conditioning application 182 that controls controller 180, as well as receives communications from controllers 180, 210. Grain conditioning application 182 may also be configured to monitor local weather conditions (e.g., from a weather information web site, from a temperature sensor of portable grain conditioner 190, or both).

Grain conditioning interface application 310 may receive information from grain conditioning application 182 including, but not limited to, operating conditions and status of portable grain conditioner 100, current weather conditions, errors, etc. Grain conditioning interface application 310 may provide a control interface to users of respective computing system 302, 304, 306 on which grain conditioning interface application 310 is located. The user may then control certain operations of portable grain conditioner 100 via grain conditioning application 182, such as changing the rotation rate of motor 130, turning portable grain conditioner 100 on or off, controlling whether portable grain conditioner 100 operates in heating or cooling mode, etc.

Computing systems 302, 304, 306 and controllers 180, 210 communicate via a network 320 (e.g., a local area network (LAN), a mobile communications network, a satellite communications network, the Internet, Bluetooth®, Bluetooth® low energy (BLE), any combination thereof, etc.) via a server 330, which has access to a database 340. Server 330 may store user account information, weather information, and the like in database 340. In some embodiments, server 330 may host grain conditioning interface application 310 as a web application, and users of computing systems 302, 304, 306 may access this application via a web browser. In some embodiments, controller 180 and/or server 330 are configured to generate alerts when an issue arises. For instance, if motor 130 can't be turned on due to a hardware failure or a lack of fuel, controller 180 may provide this information, which is then sent by server 330 to grain conditioning application 182, and potentially on to grain conditioning interface application 310. The user can then remedy the issue by calling a repair service or providing fuel. However, in some embodiments, server 330 is not included and controller 180 has a local database and/or stored files and can still interact with grain conditioning interface application 310 and its respective computing system 302, 304, 306 via s suitable communication technology, such as BLE.

Figure 4:
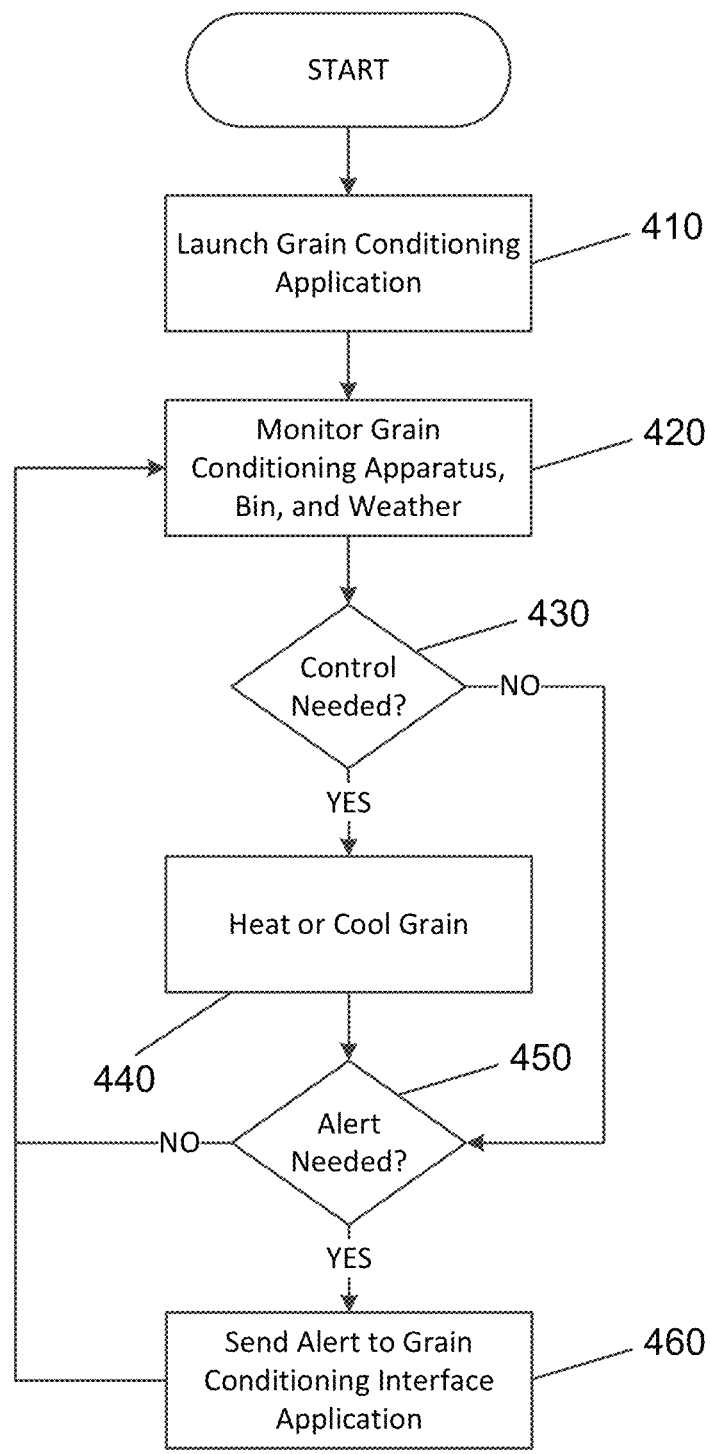
FIG. 4 is a flowchart illustrating a process for controlling a grain conditioning apparatus, according to an embodiment of the present invention.

FIG. 4 is a flowchart illustrating a process 400 for controlling a grain conditioning apparatus, according to an embodiment of the present invention. The process begins with launching a grain conditioning application at 410 (e.g., grain conditioning application 182 of FIG. 3). The grain conditioning apparatus, weather conditions, and grain bin are monitored at 420. When control of the grain conditioning apparatus is needed at 430, the grain conditioning apparatus automatically heats or cools the grain as appropriate if it has been configured to do so. Alternatively, the user may be informed of conditions via the grain conditioning application sending this information to a grain conditioning interface application of the user's computing system, and the user can turn heating or cooling on or off as desired.

If an alert is needed at 450, the alert is sent to the grain conditioning interface application by the grain conditioning application at 460. For instance, if the moisture or temperature of the grain is outside a threshold, the outside temperature is too warm or too cold, it is raining outside, there is an issue with the operation of the grain conditioning apparatus, etc., an alert may be sent. The process then returns to step 420.

Figure 5:
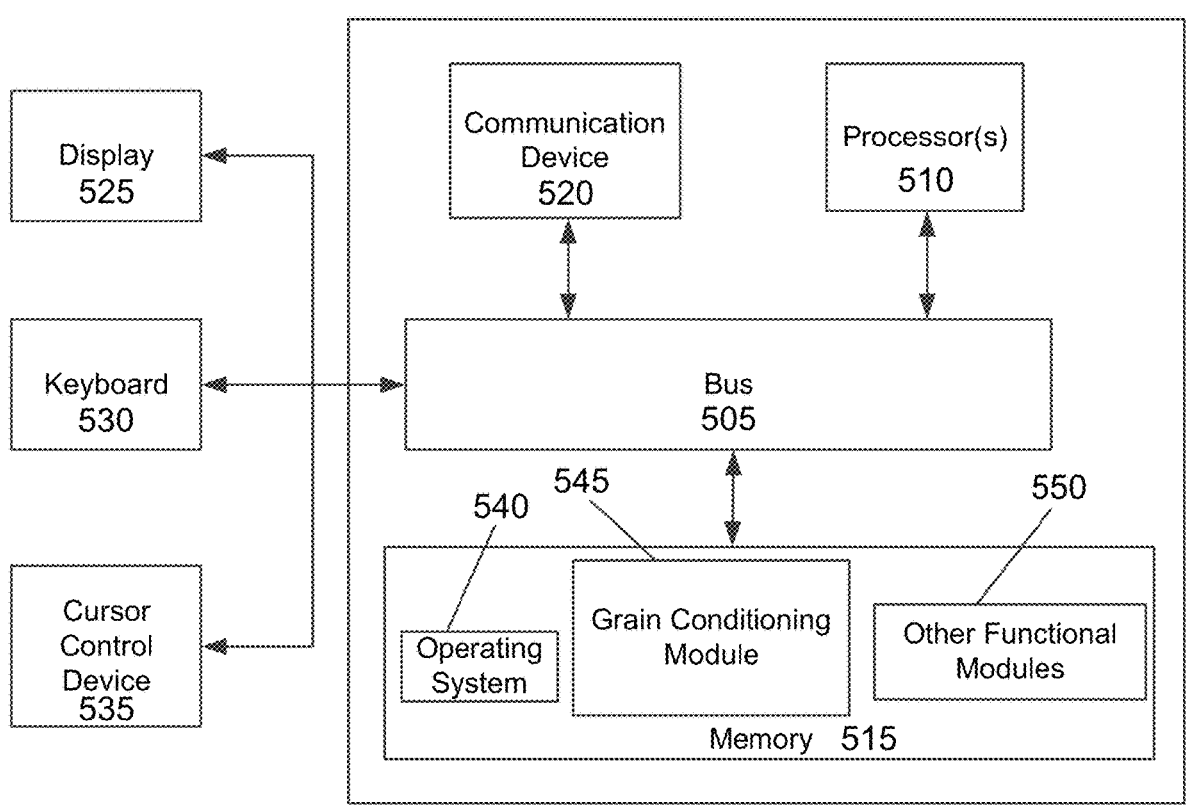
FIG. 5 is an architectural diagram illustrating a computing system configured to control operation of a grain conditioning apparatus, according to an embodiment of the present invention.

FIG. 5 is an architectural diagram illustrating a computing system 500 configured to control operation of a grain conditioning apparatus, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a grain conditioning module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 4 may be performed by a computer program, encoding instructions for the processor(s) to perform at least part of the process(es) described in FIG. 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A grain conditioning apparatus, comprising:
a motor housing that houses a motor;
an impeller housing that houses an impeller; and
a housing adapter plate located between the motor housing and the impeller housing, the housing adapter plate comprising an opening, wherein
the housing adapter plate is located between the motor housing and impeller housing, and
the impeller housing is configured to directly or indirectly funnel air to a grain bin or silo.

2. The grain conditioning apparatus of claim 1, further comprising:
a motor located within or at least partially covered by the motor housing;
an impeller located within or at least partially covered by the impeller housing; and
a shaft operably connected to the motor and the impeller such that when the motor rotates the shaft, the motor also rotates the impeller, wherein
the shaft passes through the opening of the housing adapter plate.

3. The grain conditioning apparatus of claim 2, further comprising:
an exhaust manifold operably connected to or integrated with the motor, wherein
the motor is a combustion engine,
the motor housing comprises an exhaust port, and
the exhaust manifold is configured to deliver exhaust gas from the motor to an outside of the motor housing via the exhaust port.

4. The grain conditioning apparatus of claim 3, further comprising:
a heat exchanger located in a path of the exhaust gas and configured to extract heat from the exhaust gas, wherein
the heat exchanger is configured to operate as a muffler that reduces acoustic emissions from the motor.

5. The grain conditioning apparatus of claim 4, further comprising:
a rotatable cover comprising an opening, wherein
the rotatable cover is operably connected to the motor housing on an opposite side to the housing adapter plate, and
the rotatable cover is configured to be rotated such that the opening exposes the heat exchanger or the rotatable cover shields the heat exchanger.

6. The grain conditioning apparatus of claim 4, further comprising:
a cover, wherein
the cover is operably connected to the motor housing on an opposite side to the housing adapter plate, and
the cover shields the heat exchanger.

7. The grain conditioning apparatus of claim 2, further comprising:
a controller configured to control operation of the motor, the controller configured to automatically start and stop the motor based on one or more conditions, control a rotation speed of the motor, control a fuel supply of the motor, or any combination thereof.

8. The grain conditioning apparatus of claim 7, wherein the one or more conditions for automatically starting and stopping the motor comprise a humidity level, a grain moisture level, a temperature, a time of day, weather conditions, or a combination thereof.

9. The grain conditioning apparatus of claim 7, wherein the controller is configured to automatically start operation of the grain conditioning apparatus at a first time of day and automatically stop operation of the grain conditioning apparatus at a second time of day.

10. The grain conditioning apparatus of claim 7, wherein the controller is configured to be controlled by an external computing system.

11. The grain conditioning apparatus of claim 2, further comprising:
an impeller shroud located between the impeller and the housing adapter plate, the shaft passing through an opening of the impeller shroud.

12. The grain conditioning apparatus of claim 1, further comprising:
at least one additional heat source, wherein
heat from the at least one additional heat source is directed into the motor housing, the impeller housing, the grain bin or silo, or any combination thereof.

13. The grain conditioning apparatus of claim 1, further comprising:
a heat exchanger located within the motor housing, wherein
the motor housing and the heat exchanger are configured to house and operably connect to a plurality of different motors, respectively, and
a size and shape of the impeller housing corresponds to an impeller designed to operate with a motor of the plurality of different motors.

14. The grain conditioning apparatus of claim 1, further comprising:
a heat exchanger located within the motor housing; and
a cover comprising an open portion and a covered portion, wherein
the cover is operably connected to the motor housing on an opposite side to the housing adapter plate, and
the cover is configured to be rotated or attached to the motor housing, the heat exchanger, or both, such that the open portion of the cover exposes the heat exchanger or the covered portion of the cover shields the heat exchanger.

15. A grain conditioning apparatus, comprising:
a motor housing;
a motor located within or at least partially covered by the motor housing;
an impeller housing that houses an impeller, wherein the impeller is located within or at least partially covered by the impeller housing;
a housing adapter plate located between the motor housing and the impeller housing, the housing adapter plate comprising an opening; and
a shaft operably connected to the motor and the impeller such that when the motor rotates the shaft, the motor also rotates the impeller, wherein
the housing adapter plate is located between the motor housing and impeller housing,
the shaft passes through the opening of the housing adapter plate, and
the impeller housing is configured to directly or indirectly funnel air to a grain bin or silo.

16. The grain conditioning apparatus of claim 15, wherein the motor housing and the impeller housing are operably connected to the housing adapter plate.

17. The grain conditioning apparatus of claim 15, further comprising:
a controller configured to control operation of the motor, the controller configured to automatically start and stop the motor based on one or more conditions, control a rotation speed of the motor, control a fuel supply of the motor, or any combination thereof, wherein the one or more conditions comprise a humidity level, a grain moisture level, a temperature, a time of day, weather conditions, or a combination thereof.

18. The grain conditioning apparatus of claim 15, further comprising:

an impeller shroud located between the impeller and the housing adapter plate, the shaft passing through an opening of the impeller shroud.

19. The grain conditioning apparatus of claim 15, further comprising:

at least one additional heat source, wherein heat from the at least one additional heat source is directed into the motor housing, the impeller housing, the grain bin or silo, or any combination thereof.

20. The grain conditioning apparatus of claim 15, further comprising:

a heat exchanger located within the motor housing, wherein the motor housing and the heat exchanger are configured to house and operably connect to a plurality of different motors, respectively, and a size and shape of the impeller housing corresponds to an impeller designed to operate with a motor of the plurality of different motors.

21. The grain conditioning apparatus of claim 15, further comprising:

a heat exchanger located within the motor housing; and a cover comprising an open portion and a covered portion, wherein the cover is operably connected to the motor housing on an opposite side to the housing adapter plate, and the cover is configured to be rotated or attached to the motor housing, the heat exchanger, or both, such that the open portion of the cover exposes the heat exchanger or the covered portion of the cover shields the heat exchanger.

22. A grain conditioning apparatus, comprising:

a motor housing that houses a motor and comprising a heat exchanger, the motor housing and heat exchanger configured to house and operably connect to a plurality of different motors, respectively;

an impeller housing that houses an impeller, a size and shape of the impeller housing corresponding to an impeller designed to operate with a motor of the plurality of different motors; and a housing adapter plate located between the motor housing and the impeller housing, the housing adapter plate comprising an opening, wherein the housing adapter plate is located between the motor housing and impeller housing, and the motor housing and the impeller housing are operably connected to the housing adapter plate.

23. The apparatus of claim 22, further comprising:

a motor located within or at least partially covered by the motor housing;

an impeller located within or at least partially covered by the impeller housing; and a shaft operably connected to the motor and the impeller such that when the motor rotates the shaft, the motor also rotates the impeller, wherein the shaft passes through the opening of the housing adapter plate.

* * * * *